United States Patent
Fagans et al.

(10) Patent No.: US 8,276,098 B2
(45) Date of Patent: Sep. 25, 2012

(54) INTERACTIVE IMAGE THUMBNAILS

(75) Inventors: Joshua Fagans, Redwood City, CA (US); Simeon Leifer, Santa Clara, CA (US); Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1134 days.

(21) Appl. No.: 11/685,672

(22) Filed: Mar. 13, 2007

(65) Prior Publication Data

US 2008/0155458 A1 Jun. 26, 2008

Related U.S. Application Data

(60) Provisional application No. 60/871,740, filed on Dec. 22, 2006.

(51) Int. Cl.
*G06F 3/048* (2006.01)
(52) U.S. Cl. ......... 715/811; 715/810; 715/823; 715/835
(58) Field of Classification Search .................. 715/810, 715/811, 823, 835
See application file for complete search history.

(56) References Cited

U.S. PATENT DOCUMENTS

| | | | |
|---|---|---|---|
| 5,699,458 A | 12/1997 | Sprague | |
| 5,812,128 A | 9/1998 | Sterling | |
| 5,818,437 A * | 10/1998 | Grover et al. | 715/811 |
| 5,880,722 A | 3/1999 | Brewer et al. | |
| 6,018,774 A | 1/2000 | Mayle et al. | |
| 6,160,553 A | 12/2000 | Robertson et al. | |
| 6,249,316 B1 | 6/2001 | Anderson | |
| 6,374,260 B1 | 4/2002 | Hoffert et al. | |
| 6,408,301 B1 | 6/2002 | Patton et al. | |
| 6,437,797 B1 | 8/2002 | Ota | |
| 6,490,370 B1 | 12/2002 | Krasinski et al. | |
| 6,542,936 B1 | 4/2003 | Mayle et al. | |

(Continued)

FOREIGN PATENT DOCUMENTS

EP 0576030 12/1993

(Continued)

OTHER PUBLICATIONS

Adelman, Kenneth & Gabrielle, California Coastal Protection Network, California Coastal Records Project—Aerial Photographs of the California Coastline retrieved from: http://www.californiacoastline.org/, [online] [retrieved on Jul. 5, 2007].

(Continued)

*Primary Examiner* — Andrey Belousov
(74) *Attorney, Agent, or Firm* — Fish & Richardson P.C.

(57) ABSTRACT

A computer-implemented method includes displaying, within a user interface, a view pane having a vertical direction and a horizontal direction, displaying, within the view pane, a plurality of poster frames, each poster frame representing a corresponding media item, a first poster frame being displayed as positioned in a first row extending across the event view pane in the horizontal direction such that the first poster frame is displayed substantially adjacent to a first vertical edge of the event view pane and subsequent poster frames are displayed substantially adjacent to one another in the first row until a poster frame in the first row is displayed substantially adjacent to a second vertical edge of the event view pane, and displaying a next poster frame in a second row vertically displaced from the first row. Photographs in a poster frame can be previewed by moving a cursor across the poster frame.

60 Claims, 8 Drawing Sheets

U.S. PATENT DOCUMENTS

| | | | |
|---|---|---|---|
| 6,545,687 | B2 | 4/2003 | Scott et al. |
| 6,700,612 | B1 | 3/2004 | Anderson et al. |
| 6,734,909 | B1 | 5/2004 | Terane et al. |
| 6,871,231 | B2 | 3/2005 | Morris |
| 6,904,160 | B2 | 6/2005 | Burgess |
| 6,912,327 | B1 | 6/2005 | Hori et al. |
| 6,919,910 | B2 | 7/2005 | Chang |
| 7,020,848 | B2 | 3/2006 | Rosenzweig et al. |
| 7,100,123 | B1 | 8/2006 | Todd et al. |
| 7,146,576 | B2 | 12/2006 | Chang et al. |
| 7,162,488 | B2 | 1/2007 | DeVorchik et al. |
| 7,197,751 | B2 | 3/2007 | Fedotov et al. |
| 7,243,101 | B2 | 7/2007 | Itou |
| 7,437,005 | B2 | 10/2008 | Drucker et al. |
| 7,689,915 | B2 | 3/2010 | Kitamaru et al. |
| 7,707,517 | B2 | 4/2010 | Bier et al. |
| 7,836,091 | B2 | 11/2010 | Deshpande |
| 2001/0022621 | A1 | 9/2001 | Squibbs |
| 2002/0000998 | A1* | 1/2002 | Scott et al. .................... 345/667 |
| 2002/0051262 | A1 | 5/2002 | Nuttall et al. |
| 2002/0107973 | A1 | 8/2002 | Lennon et al. |
| 2002/0109728 | A1* | 8/2002 | Tiongson et al. ............. 345/786 |
| 2002/0143762 | A1 | 10/2002 | Boyd et al. |
| 2002/0163545 | A1 | 11/2002 | Hii |
| 2003/0076322 | A1 | 4/2003 | Ouzts et al. |
| 2003/0084087 | A1 | 5/2003 | Berry |
| 2003/0146939 | A1 | 8/2003 | Petropoulos et al. |
| 2004/0205633 | A1 | 10/2004 | Martinez et al. |
| 2005/0063613 | A1 | 3/2005 | Casey et al. |
| 2005/0078174 | A1 | 4/2005 | Casey et al. |
| 2005/0091596 | A1 | 4/2005 | Antony et al. |
| 2005/0091612 | A1 | 4/2005 | Stabb et al. |
| 2005/0108620 | A1 | 5/2005 | Allyn et al. |
| 2005/0223329 | A1 | 10/2005 | Schwartz et al. |
| 2005/0231512 | A1 | 10/2005 | Niles et al. |
| 2005/0283734 | A1 | 12/2005 | Santoro et al. |
| 2006/0026523 | A1 | 2/2006 | Kitamaru et al. |
| 2006/0044401 | A1 | 3/2006 | Park |
| 2006/0066752 | A1 | 3/2006 | Kelliher |
| 2006/0090359 | A1 | 5/2006 | Bork |
| 2006/0114338 | A1 | 6/2006 | Rothschild |
| 2006/0155761 | A1 | 7/2006 | Van et al. |
| 2006/0187317 | A1 | 8/2006 | Montulli et al. |
| 2006/0224993 | A1 | 10/2006 | Wong et al. |
| 2006/0251339 | A1 | 11/2006 | Gokturk et al. |
| 2007/0058932 | A1 | 3/2007 | Wafler |
| 2007/0098266 | A1 | 5/2007 | Chiu et al. |
| 2007/0112852 | A1 | 5/2007 | Sorvari et al. |
| 2007/0127833 | A1 | 6/2007 | Singh |
| 2007/0188626 | A1 | 8/2007 | Squilla et al. |
| 2007/0223878 | A1 | 9/2007 | Abe et al. |
| 2008/0037826 | A1 | 2/2008 | Sundstrom et al. |
| 2008/0104019 | A1 | 5/2008 | Nath |
| 2008/0148152 | A1 | 6/2008 | Blinnikka et al. |
| 2008/0155458 | A1 | 6/2008 | Fagans et al. |
| 2008/0170781 | A1 | 7/2008 | Woolgar |
| 2008/0174676 | A1 | 7/2008 | Squilla et al. |
| 2008/0304808 | A1 | 12/2008 | Newell et al. |
| 2009/0031246 | A1 | 1/2009 | Cowtan et al. |
| 2009/0044133 | A1 | 2/2009 | Goto et al. |
| 2009/0135274 | A1 | 5/2009 | Kim et al. |

FOREIGN PATENT DOCUMENTS

| | | | |
|---|---|---|---|
| EP | 1283482 | A2 | 2/2003 |
| EP | 1566752 | A3 | 3/2006 |
| EP | 1729263 | | 12/2006 |
| JP | 9027937 | A | 1/1997 |
| JP | 2002259410 | A | 9/2002 |
| JP | 2008131330 | A | 6/2008 |
| JP | 2008146191 | A | 6/2008 |
| WO | 01/75645 | | 10/2001 |
| WO | 2005/001658 | | 1/2005 |
| WO | WO2005001714 | A1 | 1/2005 |
| WO | WO2008079750 | A3 | 10/2008 |

OTHER PUBLICATIONS hppt://www.californiacoastline.org, California Coastal Records Project, "About the Project", Photography and website, Copyright © 2002-2006 Kenneth & Gabrielle Adelman, Adelman@Adelman.com.

Notification of Transmittal of the International Search Report and the Written Opinion of the International Searching Authority for International Application No. PCT/US2008/056656, filed Mar. 12, 2008, mailed Aug. 1, 2008. Published by the European Patent Office.

Notification of Transmittal of the International Search Report and the Written Opinion of the International Searching Authority for International Application No. PCT/US2007/087660, filed Dec. 14, 2007, mailed Jul. 30, 2008. Published by the European Patent Office.

Anonymous: "Indexing and recall of capture events", Research Disclosure, Mason Publication, Hampshire, GB, vol. 422, No. 66, Jun. 1, 1999, XP007124469 ISSN: 0374-4353.

Anonymous: "Digital Camera with Global Positioning Satellite to Record Location with Image", Research Disclosure, vol. 41, No. 413, Sep. 1, 1998, XP002522567 Havant, UK, article No. 413126.

Hewagamage, K.P. et al., "Augmented Album: situation-dependent system for a personal digital video/image collection"; Multimedia and Expo, 2000. ICME 2000. 2000 IEEE International Conference on New York, NY, USA, Jul. 30-Aug. 2, 2000, Piscataway, NJ, USA, IEEE, US, vol. 1, Jul. 30, 2000, pp. 323-326.

Brian K. Smith et al., Inquiry with imagery: historical archive retrieval with digital cameras, Proeedings of the seventh ACM international conference on Multimedia (Part 1), p. 405-408, Oct. 30-Nov. 5, 1999, Orlando, Florida, US.

Cato, "Digital Camera with Global Positioning Datellite to Record Location with Image", IBM Technical Disclosure, Sep. 1, 1998.

O'Hare et al., My digital photos: where and when?, ACM Multimedia 2005—13th ACM International Conference on Multimedia 2005, Nov. 6-12, 2005, Singapore.

Sony GPS tracker for photographers, Aug. 2, 2006.

Chinese Notification of the First Office Action (with English translation) for Application No. 200780051294.9 dated Feb. 6, 2012, 9 pages.

U.S. Non-Final Office Action for U.S. Appl. No. 12/703,620 dated Feb. 9, 2012 (42 pages).

U.S. Non-Final Office Action for U.S. Appl. No. 11/760,684 dated Jun. 23, 2011 (15 pages).

U.S. Final Office Action for U.S. Appl. No. 11/760,684 dated Dec. 8, 2010 (20 pages).

U.S. Non-Final Office Action for U.S. Appl. No. 11/760,684 dated Mar. 8, 2010 (17 pages).

U.S. Final Office Action for U.S. Appl. No. 11/760,684 dated Mar. 7, 2012 (14 pages).

U.S. Non-Final Office Action for U.S. Appl. No. 11/834,589 dated Apr. 29, 2010, 13 pages.

U.S. Non-Final Office Action for U.S. Appl. No. 11/834,589 dated Nov. 29, 2010, 14 pages.

U.S. Non-Final Office Action for U.S. Appl. No. 11/834,589 dated Nov. 18, 2011, 16 pages.

* cited by examiner

INTERACTIVE IMAGE THUMBNAILS

CROSS REFERENCE TO RELATED APPLICATION

This application claims the benefit of the filing date of U.S. Provisional Application Ser. No. 60/871,740, filed on Dec. 22, 2006, and entitled "Two-Dimensional Timeline", the entire disclosure of which is incorporated herein by reference.

TECHNICAL FIELD

In general, this document describes systems and techniques for presenting electronic images such as digital or digitized photographs.

BACKGROUND

Digital photography has simplified taking, viewing, and printing photographs. Photographs can be taken either using high-end equipment such as digital single lens reflex (SLR) cameras, low resolution cameras including point-and-shoot cameras and cellular telephone instruments with suitable capabilities. Photographs can be transferred either individually as files or collectively as folders containing multiple files from the cameras to other media including computers, printers, and storage devices.

Software applications, such as iPhoto (manufactured by Apple Computer, Inc. of Cupertino, Calif.), can be used to arrange, display, and edit digital photographs obtained from a camera or any other electronic image in a digital format. Such software applications provide a user in possession of a large repository of photographs with the capabilities to organize, view, and edit the photographs. Users can organize photographs into albums and create slide shows to view the albums. Software manufacturers regularly add features to the software so that frequent operations, including transferring photographs from the device to a computer, and arranging and displaying the photographs, are relatively easy for an average user to perform.

SUMMARY

In one example, a system can upload multiple albums of images, display each album as a thumbnail in a user interface, represent each album by an image in the album, and allow a user to scan the images in the album by moving a cursor across the thumbnail representing the album.

In one aspect, a computer-implemented method is described. The method can include displaying, within a user interface, a view pane having a vertical direction and a horizontal direction, displaying, within the view pane, a plurality of poster frames, each poster frame representing a corresponding media item, a first poster frame being displayed as positioned in a first row extending across the view pane in the horizontal direction such that the first poster frame is displayed substantially adjacent to a first vertical edge of the view pane and subsequent poster frames are displayed substantially adjacent to one another in the first row until a poster frame in the first row is displayed substantially adjacent to a second vertical edge of the view pane, and displaying a next poster frame in a second row vertically displaced from the first row.

This and other aspects can include one or more of the following features. An order of display of the poster frames can correspond to an order in which the corresponding media items were captured, wherein progression of time corresponds to positioning of the poster frames going from left to right in the horizontal direction and top to bottom in the vertical direction. The first vertical edge can include a left edge of the view pane and the second vertical edge can include a right edge of the view pane. The second row can be below the first row. The adjacent rows can be separated by a space. The media items can include one or more of photographs in a digital or digitized format and electronic images. The media item can represent a document and the document can include one or more pages. A number of poster frames in a row or a number of rows, or both, can automatically change in response to a user varying the size of the view pane. A first poster frame can be separated from a second poster frame by a space. One or more poster frames can be hidden from display in response to user input. Hiding one or more poster frames from display can cause remaining visible poster frames to be repositioned to fill voids corresponding to the hidden poster frames. Each of the poster frames can have a uniform horizontal dimension and a uniform vertical dimension. The poster frame can be represented by a bounded region. The method can further include determining a position of a cursor within the bounded region of a poster frame, the poster frame representing a container, the container including one or more photographs, and displaying within the bounded region of a photograph from among the one or more photographs based on the determined cursor position.

In another aspect, a medium bearing instructions is described. The instructions can enable one or more machines to perform operations including displaying, within a user interface, a view pane having a vertical direction and a horizontal direction, displaying, within the view pane, a plurality of poster frames, each poster frame representing a corresponding media item, a first poster frame being displayed as positioned in a first row extending across the view pane in the horizontal direction such that the first poster frame is displayed substantially adjacent to a first vertical edge of the view pane and subsequent poster frames are displayed substantially adjacent to one another in the first row until a poster frame in the first row is displayed adjacent to a second vertical edge of the view pane, and displaying a next poster frame in a second row vertically displaced from the first row.

This and other aspects can include one or more of the following features. An order of display of the poster frames can correspond to an order in which the corresponding media items were captured, wherein progression of time can correspond to positioning of the poster frames going from left to right in the horizontal direction and top to bottom in the vertical direction. The first vertical edge can include a left edge of the view pane and the second vertical edge can include a right edge of the view pane. The second row can be below the first row. Adjacent rows can be separated by a space. The media items can include one or more of photographs in a digital or digitized format and electronic images. A number of poster frames in a row or a number of rows, or both, can automatically change in response to a user varying the size of the view pane. A first poster frame can be separated from a second poster frame by a space. One or more poster frames can be hidden from display in response to user input. Hiding one or more poster frames from display can cause remaining visible poster frames to be repositioned to fill voids corresponding to the hidden poster frames. Each of the poster frames can have a uniform horizontal dimension and a uniform vertical dimension. The poster frame can be represented by a bounded region. The medium can further bear instructions to enable one or more machines to perform operations including determining a position of a cursor within the bounded region of a poster frame, the poster frame representing a container, the container comprising one or more photographs, and displaying within the bounded region a photograph from among the one or more photographs based on the determined cursor position.

In another aspect, a computer-implemented method is described. The method can include displaying, within a user interface, a view pane having a vertical direction and a horizontal direction, and displaying, within the view pane, a poster frame represented by a bounded region, the poster frame representing a container, the container comprising one or more objects. Based on an assignment, an assigned object in the container can represent the one or more objects in the container. The assigned object can be displayed within the bounded region of the poster frame.

This and other aspects can include one or more of the following features. The assignment can be based on factors including one or more of user input, a ranking of the one or more objects in the container, or a quality of the object. The user input can include a user choosing the assigned object from among the one or more objects in the container. The rank of each object in the container can be based on user input. The rank of each object can be determined based on a number of times each object is accessed. The quality of each object is represented by a resolution. The assigned object can be a high resolution object. The one or more objects can include one or more of photographs in a digital or digitized format and electronic images. The method can further include determining a first position of a cursor within the bounded region of the poster frame, wherein one or more positions of the cursor can correspond to one or more objects in the container, and displaying within the bounded region a first object from among the one or more objects corresponding to the first position in place of the assigned object. The method can additionally include detecting that the cursor has moved to a second position within the bounded region, and updating the bounded region to display a second object from among the one or more objects corresponding to the second position. The method can additionally include displaying a magnifying window adjacent to the cursor and displaying the objects in the container corresponding to the cursor position in the magnifying window. The assigned object can be displayed within the bounded region when the cursor is located away from the bounded region. A position of the cursor can be altered based on user input. The user interface can be transmitted over a network. The network can be the internet. The objects displayed in the user interface can be accessed from a remote location connected to the network.

In another aspect, a medium bearing instructions is described. The instructions can enable one or more machines to perform operations including displaying, within a user interface, a view pane having a vertical direction and a horizontal direction, and displaying, within the view pane, a poster frame represented by a bounded region, the poster frame representing a container, the container comprising one or more objects. Based on an assignment, an assigned object in the container can represent the one or more objects in the container. The assigned object can be displayed within the bounded region of the poster frame.

This and other aspects can include one or more of the following features. The assignment can be based on factors including one or more of user input, a ranking of the one or more objects in the container, or a quality of the object. The user input can include a user choosing the assigned object from among the one or more objects in the container. The rank of each object in the container can be based on user input. The rank of each object can be determined based on a number of times each object is accessed. The quality of each object is represented by a resolution. The assigned object can be a high resolution object. The one or more objects can include one or more of photographs in a digital or digitized format and electronic images. The operations can further include determining a first position of a cursor within the bounded region of the poster frame, wherein one or more positions of the cursor can correspond to one or more objects in the container, and displaying within the bounded region a first object from among the one or more objects corresponding to the first position in place of the assigned object. The operations can additionally include detecting that the cursor has moved to a second position within the bounded region, and updating the bounded region to display a second object from among the one or more objects corresponding to the second position. The operations can additionally include displaying a magnifying window adjacent to the cursor and displaying the objects in the container corresponding to the cursor position in the magnifying window. The assigned object can be displayed within the bounded region when the cursor is located away from the bounded region. A position of the cursor can be altered based on user input. The user interface can be transmitted over a network. The network can be the internet. The objects displayed in the user interface can be accessed from a remote location connected to the network.

In another aspect, a computer-implemented method is described. The method can include displaying, within a user interface, a view pane, and displaying, within the view pane, one or more representative objects, the one or more representative objects representing a plurality of objects in a container, the container represented by the view pane, wherein the one or more representative objects can be chosen based on an assignment.

This and other aspects can include one or more of the following features. The assignment can be based on factors including one or more of user input, a ranking of the one or more objects in the container, or a quality of the object. The user input can include a user choosing the one or more representative objects from among the plurality of objects in the container. The rank of each object in the container can be based on user input. The rank of each object can be determined based on a number of times each object is accessed. The quality of each object can be represented by a resolution. The assigned object can be a high resolution object. The one or more objects can include one or more of photographs in a digital or digitized format and electronic images. The user interface can be transmitted over a network. The network can be the internet. The objects displayed in the user interface can be accessed from a remote location connected to the network.

In another aspect, a medium bearing instructions is described. The instructions can enable one or more machines to perform operations including displaying, within a user interface, a view pane, and displaying, within the view pane, one or more representative objects, the one or more representative objects representing a plurality of objects in a container, the container represented by the view pane, wherein the one or more representative objects can be chosen based on an assignment.

This and other aspects can include one or more of the following features. The assignment can be based on factors including one or more of user input, a ranking of the one or more objects in the container, or a quality of the object. The user input can include a user choosing the one or more representative objects from among the plurality of objects in the container. The rank of each object in the container can be based on user input. The rank of each object can be determined based on a number of times each object is accessed. The quality of each object can be represented by a resolution.

The assigned object can be a high resolution object. The one or more objects can include one or more of photographs in a digital or digitized format and electronic images. The user interface can be transmitted over a network. The network can be the internet. The objects displayed in the user interface can be accessed from a remote location connected to the network.

In another aspect, a computer-implemented method is described. The method can include displaying, within a user interface, a view pane having a vertical direction and a horizontal direction, displaying, within the view pane, a poster frame represented by a bounded region, the poster frame representing a container, the container including a plurality of objects, and enabling splitting the poster frame into two split poster frames in response to input, each split poster frame displayed in the view pane, each split poster frame representing a split container, the plurality of objects divided among the two split containers.

This and other aspects can include one or more of the following features. The one or more objects can include one or more of photographs in a digital or digitized format and electronic images. A position of a cursor over the poster frame can correspond to an object in the container. The object corresponding to the position of the cursor can be displayed within the bounded region of the poster frame. The objects in the container can be stored in a sequence and the split poster frame can include objects from the start of the sequence to the object displayed within the bounded region. The position of the cursor can be altered based on user input. The input can be a key stroke on a key board. The user interface can be transmitted over a network. The network can be the internet. The objects displayed in the user interface can be accessed from a remote location connected to the network.

In another aspect, a medium bearing instructions is described. The instructions can enable one or more machines to perform operations including displaying, within a user interface, a view pane having a vertical direction and a horizontal direction, displaying, within the view pane, a poster frame represented by a bounded region, the poster frame representing a container, the container including a plurality of objects, and enabling splitting the poster frame into two split poster frames in response to input, each split poster frame displayed in the view pane, each split poster frame representing a split container, the plurality of objects divided among the two split containers.

This and other aspects can include one or more of the following features. The one or more objects can include one or more of photographs in a digital or digitized format and electronic images. A position of a cursor over the poster frame can correspond to an object in the container. The object corresponding to the position of the cursor can be displayed within the bounded region of the poster frame. The objects in the container can be stored in a sequence and the split poster frame can include objects from the start of the sequence to the object displayed within the bounded region. The position of the cursor can be altered based on user input. The input can be a key stroke on a key board. The user interface can be transmitted over a network. The network can be the internet. The objects displayed in the user interface can be accessed from a remote location connected to the network.

The systems and techniques described here may provide one or more of the following advantages. Several images taken over a period of time can be grouped and collectively uploaded as albums. Each album can be a container represented by a poster frame on a user interface, where the poster frame is an image in the container. This can meaningfully represent a container containing images and allow users to identify the container based on the representative image depicting the container. Further, each container can be represented by a poster frame and the poster frames representing containers can be arranged within the user interface to indicate the chronological order in which the images were taken. The poster frames can be wrapped within the viewable area of the user interface to avoid horizontal scrolling within the user interface to access poster frames. In addition, the images within a poster frames can be viewed by placing a cursor on a display device operated by a pointing device, such as a mouse, at a desired position on a poster frames representing the container. Multiple images in a container can be scanned by moving the cursor across the poster frames representing the container. Furthermore, the management of large repositories of images can be simplified.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
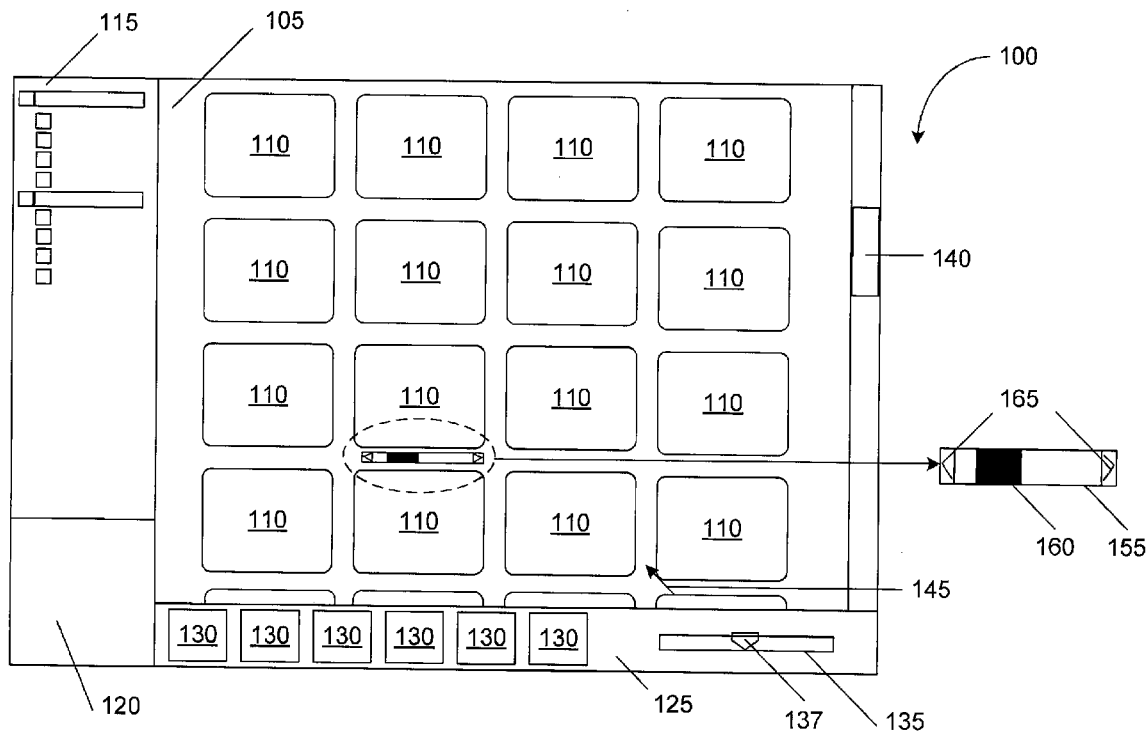
FIG. 1A is an example of a schematic of a user interface to display containers containing images.

FIG. 1A depicts an example of a user interface 100 to display containers of images. An image can include digitized and/or digital photographs. In addition, an image can also include any electronic image regardless of how it was generated, e.g., a CAD drawing, a scanned hand drawing, and the like. The user interface 100 includes a view pane 105. The view pane 105 includes one or more poster frames 110, where each poster frame 110 represents a container containing one or more images. In some implementations, an view pane 105 serves as a background on which poster frames 110 can be positioned. The view pane 105 can be assigned a display parameter, e.g., a color. Alternatively, a user can alter the display parameter of the view pane 105. A poster frame 110 has a horizontal dimension and a vertical dimension. All poster frames 110 can be displayed in a landscape orientation, namely with the horizontal dimension greater than the vertical dimension. In other implementations, all poster frames 110 can be displayed in a portrait orientation. In addition, a user can alter the orientation of the poster frames 110, either individually or collectively. In other implementations, a user can crop the poster frames so that the poster frames are square in shape. In some implementations, the user interface 100 can include a project pane 115. The project pane 115 can display metadata related to one or more of the poster frames 110 displayed in the view pane 105. For example, the project pane 115 can display a list of the latest containers that were accessed using the application. In some implementations, when a user creates a new container, an icon indicating the new container can be displayed in the project pane 115.

The user interface 100 can include an information pane 120. The information pane 120 can display metadata related to the most recently accessed poster frames 110. In some implementations, the information pane 120 can display metadata related to the poster frame 110 currently being accessed. For example, a poster frame 110 can display multiple images taken at several time instances. The information pane 120 can display information including the time stamps of the first and last images in the container represented by a poster frame 110, the number of images in the container, the size of the container (e.g., in gigabytes), and the like.

The user interface 100 can include a tool bar 125. The tool bar 125 can include one or more user control buttons 130. The user control buttons 130 can be configured to perform operations including rotate, scan, start slide show, and the like upon activation, e.g., clicking by a user. The tool bar 125 can also include a slider 135 configured to alter the dimensions of a poster frame based on input. In some implementations, the slider 135 can include a pointer 137 that can be moved. The position of a pointer 137 on the slider 135 can correspond to the dimensions of a poster frame 110. A user can alter the position of the pointer 137 using the cursor on the display device. In some implementations, the user can move the pointer 137 on the slider 135 by placing the cursor on the pointer 137, and dragging the pointer 137. In response to a change in the position of the pointer 137 on the slider 135, the dimensions of each poster frame 110 can be altered. A cursor can be represented by a conventional display 145 when positioned away from the poster frame 110. The conventional display can include an arrow.

In some implementations, a poster frame 110 can be represented by one of the images contained in the poster frame 110. When the container that the poster frame 110 represents is first uploaded for display on the view pane 105, the first image in the container can be assigned to represent the poster frame 110. Alternatively, any image in the container can be assigned to represent the poster frame 110. In some implementations, a user can rate the images in a container. The ratings of the images can be tracked and the poster frame 110 can be represented by the image with the highest rating. In other implementations, the user interactions with a container can be tracked. For example, a user may view one or more images in a container more often than other images in the container. An image viewed more often than the others can be used to represent the poster frame 110. In some implementations, a higher resolution image can be assigned to represent the container. In other implementations, a user can assign an image to represent a poster frame 110. The image representing a poster frame 110 can change over time due to one or more factors including addition of new images, deletion of old images, frequency of viewing, and the like.

The containers can be arranged in an order that can depend on factors including a name assigned to the container, a time stamp on the images in the container, and the like. Names can be assigned to containers by the cameras using which the images in the containers were taken. In a default implementation, the containers can be uploaded under the same name as that assigned to the containers by the cameras. The containers can be displayed chronologically in the order in which the images in the containers were taken based on the time stamp on each time image and/or each container. Alternatively, the containers can be displayed alphabetically based on the container names.

In some implementations, the poster frames 110 can be arranged in an order beginning from a position substantially adjacent to the left vertical edge of the view pane 105. The first poster frame 110 can be displayed substantially adjacent to the top left hand corner of the view pane 105. A new poster frame 110 can be positioned to the right of a previously displayed poster frame 110 in the same row as the first poster frame 110. In this manner, the poster frame 110 can be arranged from left to right in a row. The default horizontal and vertical dimensions of all the poster frame 110 can be predetermined and can be uniform. In a default implementation, the assigned horizontal and vertical dimensions may correspond to a central location of the pointer 137 on the slider 135. Two frames displayed on the same row can be separated by a pre-determined space.

In some implementations, as poster frames 110 are arranged in a row, each frame separated by a system assigned space, the sum of the horizontal dimensions of the poster frames 110 in a row and the spaces between the poster frames 110 in the row can exceed the available horizontal dimension of the view pane 105. Consequently, a poster frame 110 can be positioned substantially adjacent to the right vertical edge of the view pane 105. In such cases, the next poster frame 110 can be wrapped and displayed as the first poster frame 110 in a new row vertically displaced from the first row. The position of the first poster frame 110 in a new row can be substantially vertically aligned with that of the first poster frame 110 in the previous row. The space between rows can be pre-determined and uniform for all rows. Thus, multiple poster frames 110 can be arranged within the horizontal viewable region of a view pane 105. In this manner, the need to scroll horizontally to view poster frames 110 that are outside the viewing area of the view pane 105 can be avoided. In addition, the order of display of the poster frames 110 can correspond to an order in which the images in the corresponding containers were taken. The progression of time can correspond to the position of the poster frames 110 going from left to right in the horizontal direction and top to bottom in the vertical direction.

A user may wish to alter the order of display of poster frames 110 in the view pane 105. Such alterations can include adding a new poster frame 110, removing, repositioning, resizing a displayed poster frame 110, and the like. In a default implementation, containers can be detected and uploaded in the view pane 105. A file can be identified to be an image based on the file type, e.g., JPG, TIFF, GIF, DWG, and the like. All the detected containers can be displayed in the view pane 105. In other implementations, a user can select the containers that the user wishes to display in the view pane 105. In some implementations, uploading and displaying containers as poster frames 110 can be a combination of automatic detection and choices by a user.

A user may wish to remove one or more poster frames 110 displayed in the view pane 105. The 110 that the user wishes to remove may be adjacent to each other. Alternatively, the positions of the poster frames 110 may be non-adjacent to each other on a same row or on different rows. The poster frames 110 can be selected individually or as a group. In some implementations, the user can remove the poster frames 110 by pressing the "Delete" key on a key board. In other implementations, the user may drag the selected poster frames 110 and drop them into a location outside the view pane 105 (e.g., Trash, Recycle Bin). When a poster frame 110 is deleted from display, the remaining poster frames 110 can be repositioned to occupy the void created by the deleted poster frame 110. For example, if two rows of poster frames 110, each row containing five poster frames 110, are displayed in a view pane and if a user deletes the fourth poster frame 110 in the first row, the fifth poster frame 110 can be repositioned in the first row to occupy the void created by the deleted frame. Further, the first poster frame 110 in the second row can be repositioned to the fifth poster frame 110 in the first row. In this manner, all poster frames 110 in a view pane 105 can be displayed as a continuous sequence.

In some implementations, a user can change the position of a poster frame 110 in the view pane 105. A user can select a poster frame 110, drag the poster frame 110 from a present position and insert the poster frame 110 in a new position. Further, the position of all the poster frames 110 can be shifted either to the right, to a new row, or as required so that all poster frames 110 in a view pane are displayed as a continuous sequence.

When the sum of the vertical dimensions of poster frames 110 in rows and the spaces between the rows exceeds the vertical dimension of the view pane 105, a vertical scroll bar 140 can be incorporated in the user interface 100 to permit vertical scrolling to view poster frames that lie outside the area of the view pane 105. In some implementations, the contents of the view pane 105 can be vertically scrolled by placing a cursor on the vertical scroll bar 140 and dragging the bar. Alternatively, or in addition, a key board can be used to vertically scroll the view pane 105. A user can vertically scroll one or more rows by pressing a single key (e.g., arrow key) or a combination of keys (e.g., "command"+"home", "command"+"end", and the like). In other implementations, the user can pan the view pane 105 by placing the cursor anywhere on the view pane 105 and dragging the pane in a vertical direction.

In some implementations, moving the slider 135 from left of the user interface 100 to the right of the user interface 100 can cause an increase in the dimensions of each poster frame 110 and vice versa. As the dimensions of poster frames 110 in a row are increased using the slider 135, the horizontal and vertical dimensions of each poster frame 110 can be uniformly increased. The space between frames in the same row and between rows can also be uniformly increased to maintain the aesthetics of display and simplify viewing. In other implementations, the space between frames may be constant. As the dimensions of poster frames 110 in a row increase, the horizontal dimension of the row also increases. The horizontal dimension of the view pane 105 may be insufficient to display the poster frames 110 of larger dimensions in the same row. In such cases, the poster frame 110 on the right extreme of a row can be wrapped to the next row. All frames in the view pane 105 can be repositioned to accommodate the displaced frame while maintaining the order in which the poster frames 110 are displayed.

In some implementations, metadata related to each poster frame 110 can be displayed adjacent to each poster frame 110, for example, in the space between two rows. The metadata can include, the name of the poster frame 110 which can be either a system default name or a user-defined name, a time stamp, the number of photos in the poster frame, and the like. When a user deletes or repositions a poster frame 110, the metadata corresponding to the poster frame 110 can also be deleted or repositioned, respectively.

A poster frame 110 that corresponds to a container can include one or more images. In some implementations, the images in a container can be photographs that may have been taken over a period of time. The order in which cameras used to take photographs store the photographs can be chronological with the earliest taken photograph stored first. Alternatively, the order can be alphabetical, based on the file name assigned to each photograph. The photographs can be imported in an order same as the one in which the photographs are saved in the camera. Subsequently, the order in which the photographs are stored can be altered based on user input. Such alterations can include re-arranging the position of the photograph in the container, changing the name associated with a photograph and arranging the photographs alphabetically, and the like. In other implementations, the images in a container can be electronic images such as CAD drawings. The drawings can be assigned file names either automatically or based on user input. The drawings can be imported in an alphabetical order based on the assigned file name. Subsequently, the order can be altered by operations including altering the file name, re-arranging the position of the drawing, and the like. When the poster frames 110 are displayed in the view pane 105, previewing the images contained in each poster frame 110 can be enabled. In response to placing a cursor at a position on the poster frame 110, an image contained in the poster frame 110 can be displayed in place of the image assigned to represent the poster frame 110.

Figure 1B:
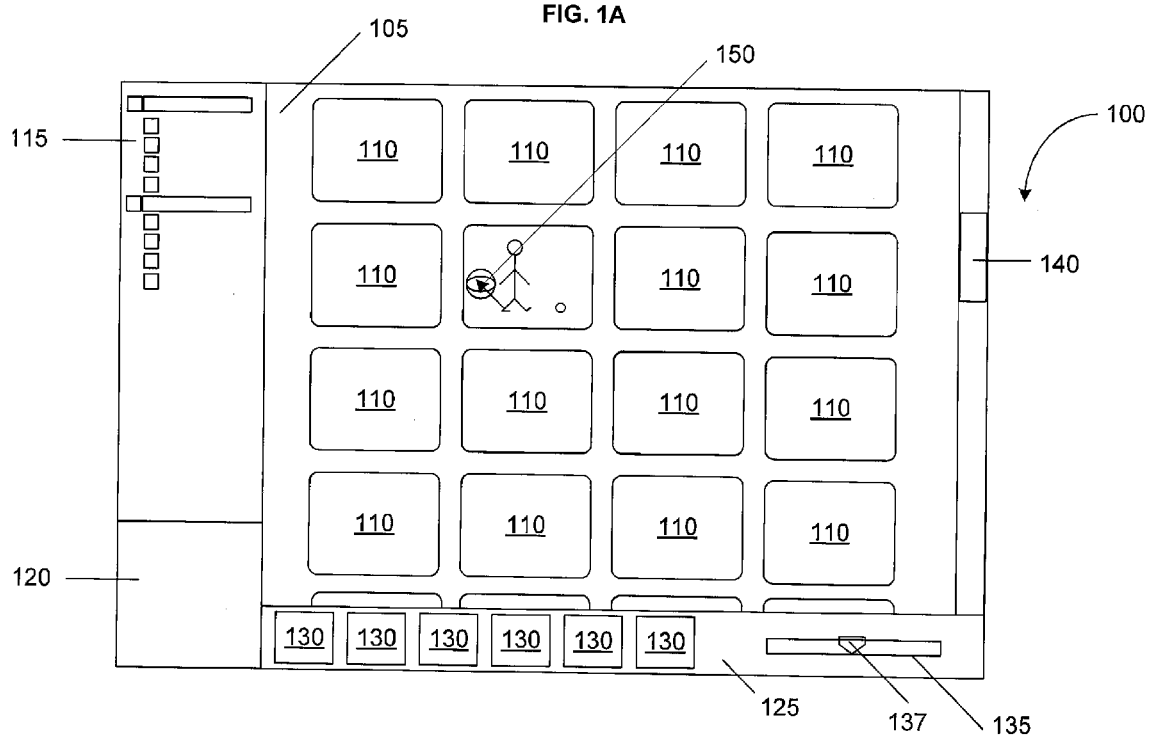
FIG. 1B is an example of a schematic of a first image in a container corresponding to a first position of a cursor.
Figure 1C:
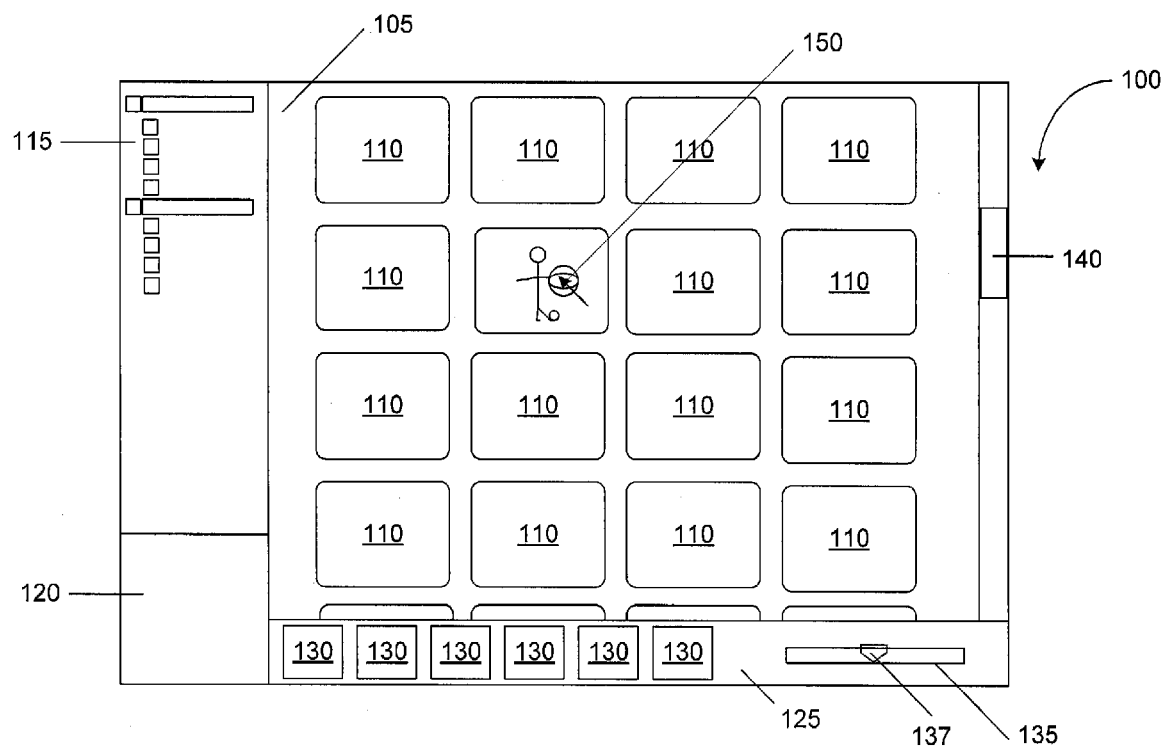
FIG. 1C is an example of a schematic of a second image in a container corresponding to a second position of a cursor.
Figure 1D:
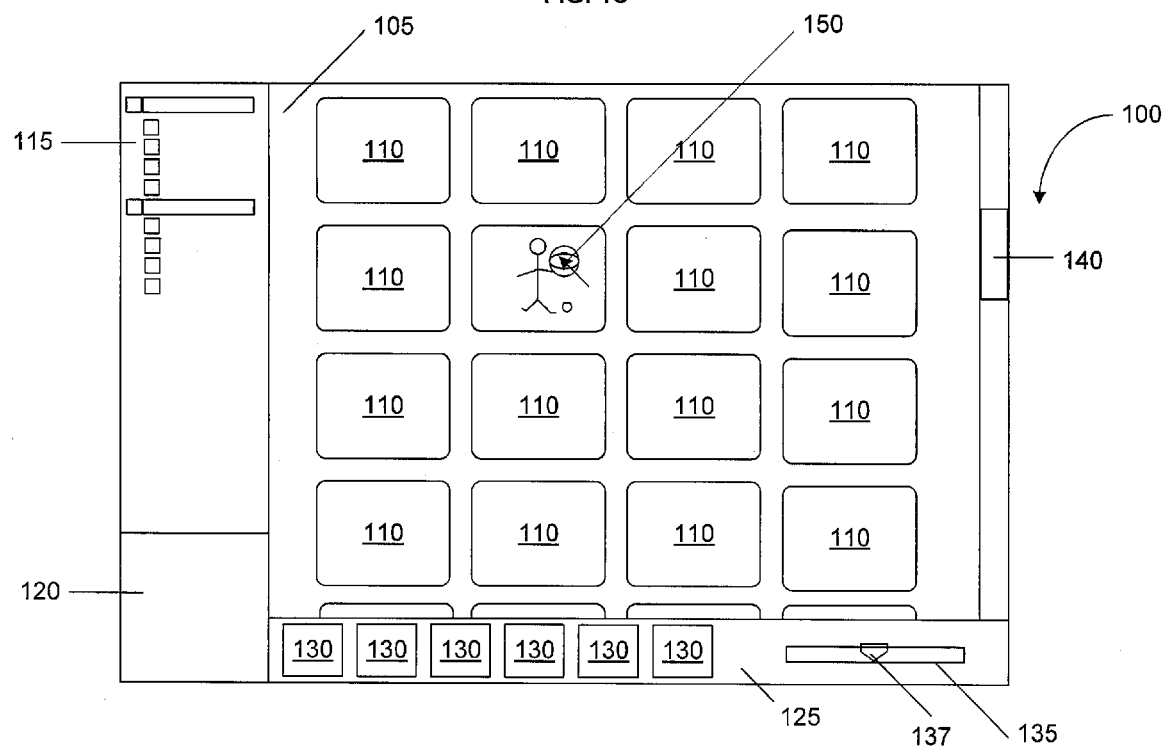
FIG. 1D is an example of a schematic of a third image in a container corresponding to a third position of a cursor.
Figure 1E:
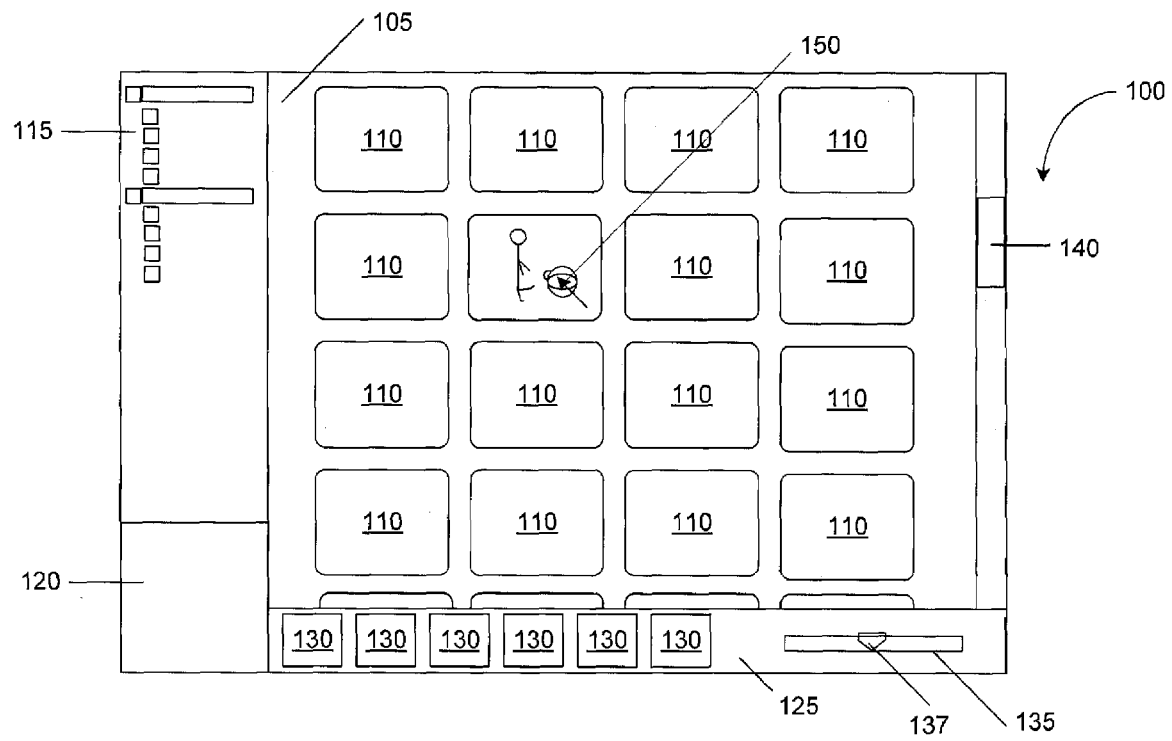
FIG. 1E is an example of a schematic of a fourth image in a container corresponding to a fourth position of a cursor.
Figure 1F:
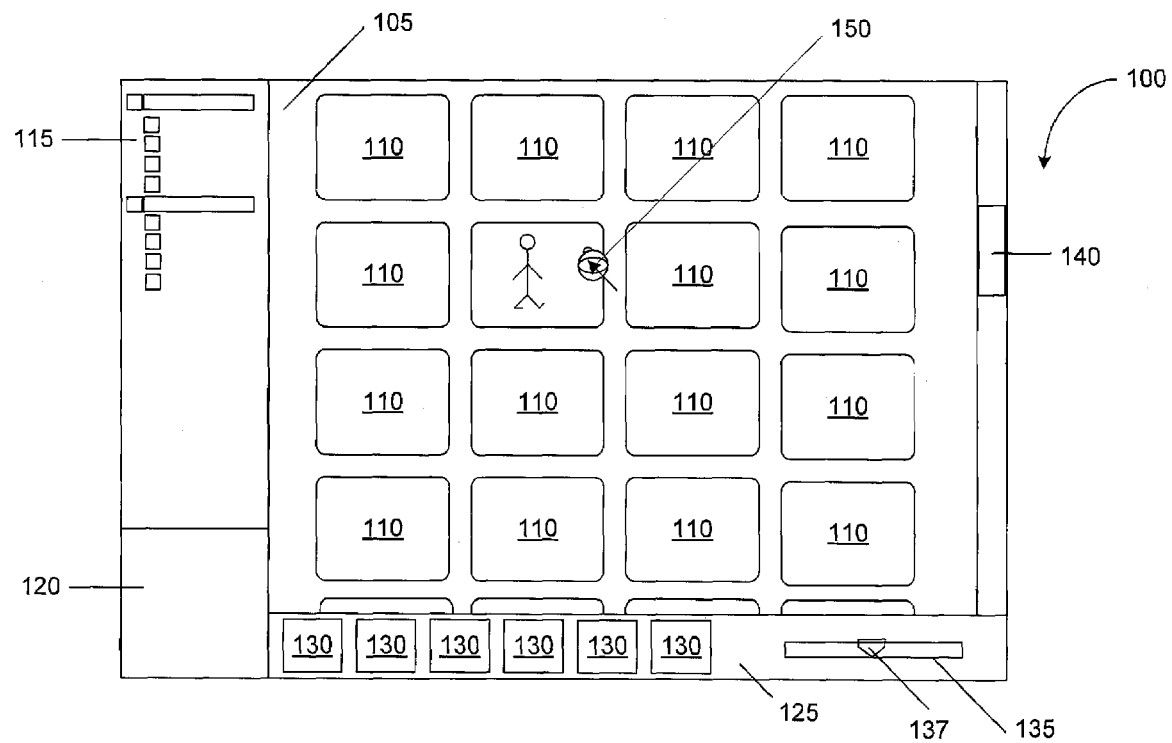
FIG. 1F is an example of a schematic of a fifth image in a container corresponding to a fifth position of a cursor.

FIGS. 1B-1F depict examples of schematics of previewing images in poster frames 110. In some implementations, when the user places the cursor on a poster frame 110, an image contained in the poster frame 110 can be displayed in place of the image assigned to represent the poster frame 110 (FIG. 1B). Further, the display of the cursor can be altered from the conventional display 145 to a specific display 150. An order in which the images in a container are stored can be related to a position of the cursor on the poster frame 110 representing the container. In some implementations, the left edge of the poster frame 110 can correspond to the first image in the container. Similarly, the right edge of the poster frame 110 can correspond to the last image in the container. If the cursor is placed at the left edge of the poster frame 110, the first image in the container can be displayed in place of the image assigned to represent the poster frame 110. When the cursor is placed at the right edge of the poster frame 110, the last image can be displayed in the container in place of the image assigned to represent the poster frame 110. As the cursor is moved from the left edge to the right edge, the display of the poster frame 110 can be continuously updated with images from the beginning to the end of the container, such that the displayed image corresponds to the position of the cursor on the poster frame 110. In this manner, by scanning the cursor across the poster frame 110 from left to right, the user can preview, from beginning to finish, all the images in the container represented by the poster frame 110. Similarly, when the cursor is scanned from the right edge to the left edge of the poster frame 110, the images in the container represented by the poster frame 110 can be previewed from the finish to the beginning. In some implementations, the images can be displayed within the bounded region of a poster frame such that the horizontal and vertical dimensions of the previewed image equal those of the poster frame 110 in place of which the image is displayed.

In some implementations, when the cursor is scanned across a poster frame 110 and moved away from the poster frame 110, the display of the poster frame 110 can be restored to the image assigned to represent the poster frame 110. In other implementations, the display of the poster frame 110 can be restored to the image assigned to represent the poster frame 110 depending on the position of the cursor on the poster frame. In other implementations, the user can be provided with an option to either preview images in a container represented by a poster frame by scanning over the poster frame or to only view the image assigned to represent the poster frame 110 when the cursor is scanned across the poster frame 110. In other implementations, the most recent image in the poster frame 110 that was previewed by scanning can be displayed. In other implementations, a user can choose an image to represent a poster frame. The user may position the cursor at a location on the poster frame to preview the image in the poster frame. The user can set the previewed image to represent the poster frame by striking a key, e.g., "Command" key. Alternatively, the user can set the image to represent the poster frame using the pointing device to operate the cursor. A cursor can be operated using virtually any suitable pointing device (e.g., mouse, track ball, stylus, touch screen, touch pad). The images in the container can be previewed by a simply moving the cursor across the poster frame 110 using the pointing device without requiring additional operation, such as clicking a mouse at any position on the poster frame 110 representing the container.

In some implementations, as the user moves the cursor across a poster frame 110, the display of the cursor can be altered from a conventional display (e.g., an arrow) to a specific display, e.g., an arrow including an image. Upon detecting that the cursor has been positioned over a poster frame 110, the display of the cursor can be automatically changed from the conventional display to the specific display. This can indicate that a poster frame 110 is being previewed. In some implementations, the specific display can be defined by the system. In other implementations, the specific display can be altered by the user. For example, the user can have a database of displays. The user can use one of the displays as the specific display. In other implementations, the user can define a specific display for each poster frame. Alternatively, the user can define multiple displays for the same poster frame. The user can define a first specific display for a second group of poster frames and a second specific display for a second group of poster frames. In some implementations, a plurality of specific displays can be configured such that the specific display of the cursor is altered based on a relationship between the images being previewed. For example, the specific display, during preview, of images in a container that share a common attribute value, such as a date when the images were created, can be common. The relationship between images that share a common specific display can be pre-determined. Alternatively, the relationship can be specified by a user. In some implementations, the specific display and the conventional display can be simultaneously displayed when the cursor is positioned over a poster frame. When the cursor is moved away from the poster frame, only the conventional display can be displayed.

In addition FIG. 1A depicts a preview scroll bar. In some implementations, the preview scroll bar 155 can be incorporated into the poster frame 110. In one example, the orientation of the preview scroll bar 155 can be horizontal. The horizontal preview scroll bar 155 can be positioned adjacent to the bottom edge of the poster frame 110. The preview scroll bar 155 can be positioned within the bounded region of the poster frame 110. Alternatively, the preview scroll bar can be positioned outside the bounded region of the poster frame 110. In other implementations, the horizontal preview scroll bar can be positioned near the top edge either within or outside the bounded region of the poster frame 110. Alternatively, the orientation of the preview scroll bar 155 can be vertical and the vertical scroll bar can be positioned either near the left edge or the right edge of the poster frame 110, inside or outside the bounded region of the poster frame 110, or combinations of the same. In some implementations, the preview scroll bar 155 can appear when the cursor is positioned over the poster frame 110. When the cursor is moved away from the poster frame 110, the preview scroll bar 155 can disappear. In other implementations, a preview scroll bar 155 can always be displayed. In other implementations, a preview scroll bar 155 can be displayed when the number of images in a container represented by the poster frame exceeds one.

The preview scroll bar 155 can include a preview pointer 160 within the bounded region of the preview scroll bar 155. A user can alter the position of a preview pointer 160 in the preview scroll bar 155 using the cursor operated by the suitable pointing device. The position of the preview pointer 160 in the preview scroll bar 155 can correspond to an image in the container such that as the position of the preview pointer 160 in the preview scroll bar 155 is altered, the image displayed in the bounded region of the poster frame 110 is also altered. In some implementations, the size of the preview pointer 160 in the preview scroll bar 155 can correspond to the number of images in the container represented by the poster frame 110. A user can move the preview pointer 160 using the pointing device, e.g., by positioning the cursor over the preview pointer 160, clicking a mouse, and dragging the preview pointer 160. As the preview pointer 160 is moved, an image in the container corresponding to the position of the preview pointer 160 can be displayed within the bounded region of the poster frame 110. In this manner, the images in the container can be previewed. In other implementations, the scroll bar 155 can include advance tools 165 on the edges of the preview scroll bar 155. The advance tools 165 on the edges of the preview scroll bar 155 can be configured to advance the images in the container. For example, if the orientation of the scroll bar is horizontal, by clicking on the advance tool on the left edge of the scroll bar using the pointing device, the user can step through each image in the container until the user views the first image in the container. Similarly, by clicking on the advance tool on the right edge of the scroll bar using the pointing device, the user can step through each image in the container until the user views the last image in the container. In this manner, the scroll bar can be further configured to enable a user to step through the images in the container one at a time.

The number of images that each poster frame 110 can contain is limited only by available storage space. The dimensions of a poster frame 110 can remain constant regardless of the number of images in the container represented by the poster frame 110. In a poster frame 110 displayed on a display device, a physical space (e.g., one or more pixels) in the horizontal dimension of the poster frame 110 can represent an image. The physical space representing an image in a container containing few images may be larger when compared to that representing an image in a container containing several images. If the resolution of the cursor is less than the physical space representing an image, then the same image can be previewed by placing the cursor at multiple adjacent positions on the poster frame 110. For example, if a container contains only two images, the first image can be previewed if the cursor is placed at any location on the left half of the poster frame 110 representing the container. Similarly, the second image can be previewed if the cursor is placed at any location on the right half of the poster frame 110 representing the container. Conversely, if a poster frame 110 represents several images, the smallest unit of physical space of the display device may be greater than the physical space required to represent an image. In such cases, if the resolution of the cursor is greater than the physical space representing an image, the physical space occupied by a cursor may span more than one image. Consequently, it may not be possible to preview all the images in the container when the cursor is scanned horizontally across the poster frame 110 representing the container.

In some implementations, while previewing a container, certain images in a container can be skipped if the resolution of the cursor is greater than the physical space representing each image in the container. In some implementations, one or more images can be skipped based on the order in which the images are stored. For example, when the cursor is moved by a distance equal to the resolution of the cursor (e.g., 1 pixel), two images may be skipped. In this example, as the cursor is moved from the left edge to the right edge of the poster frame 110, the first, fourth, seventh image, and so on, may be displayed in place of the image assigned to represent the poster frame 110. In some implementations, the size of the images can be used to skip images during previews. For example, high resolution images are generally files of larger sizes. All the high resolution images in a container may be displayed during a preview. Low resolution images may be excluded from the preview. In some implementations, the previewed images can be those images that have a higher rating than other images in the container. In some implementations, a rounding algorithm can be used to choose photos that can either be included or excluded from the preview.

In some implementations, the tool bar can include a zoom control button. When the resolution of the cursor is greater than the physical space representing each image in a container, the zoom control button can be used to increase the granularity of the poster frame. For example, the zoom control button can be used to enlarge the poster frame. The physical space representing each image can be kept constant. In this manner, the physical space representing each image can be increased to either equal or be greater than the resolution of the cursor. In such implementations, upon zooming the poster frame, more images in the container represented by the poster frame can be previewed by moving the cursor across the poster frame. In some implementations, the zoom control button can be activated by positioning the cursor over the zoom control button and clicking the mouse or other pointing device used to operate the cursor. Alternatively, the zoom control button can be activated by a key stroke on a key board.

In some implementations, the speed at which a cursor is scanned across a poster frame 110 can be higher than the speed at which the display of images in a poster frames 110 can be updated. If the speed at which the cursor is scanned across a poster frame 110 is greater than a threshold, certain images can be displayed for a preview while other images can be skipped. The images chosen for display can be based on factors including a position of the image in the order of storage, size of the image, ratings of the image, and the like. In some implementations, if the speed at which the cursor is scanned is high, then no image in a container can be previewed.

In some implementations, an image in a container can be chosen by placing the cursor over the poster frame representing the container and clicking the mouse. Alternatively, or in addition, an image can be chosen by placing the cursor over the poster frame representing the container and selecting a key on a keyboard, e.g., the "Enter" key. Additionally, when an image in a container in a poster frame 110 is previewed, successive images can subsequently be previewed using the keys on the key board. For example, the user can place a cursor on a poster frame 110. In response, an image in the container can be displayed corresponding to the location of the cursor in the poster frame 110. Subsequently, the user can use keys on a key board (e.g., arrow keys) to preview successive images stored in the container. In some implementations, by pressing the right arrow key, the user can scan from the beginning of the container to the end of the container. Conversely, the user can scan from the end to the beginning of the container using the left arrow key. In other implementations, any combination of keys can be used to scan successive photos in the container. In addition, keys and/or key sequences can be used to jump to the beginning or end of a container from anywhere in the container. Such keys can include the "Home" key, the "End" key, and the like. In addition, keys and key sequences can also be used to jump from one container to another, e.g., "Command"+"Home" key to jump to the first container, "Command"+"End" key to jump to the last container, tab key to jump from one container to the next, and the like.

In some implementations, a user can split a container into multiple containers using a key stroke. For example, a user previewing the images in a container can place the cursor at any position on the container. Subsequently, the user can strike a key, e.g., "Command" key. In response, the container can be split into two containers, where each container can be represented by a poster frame. When a container represented by a poster frame 110 is split into two containers, each container represented by a respective poster frame 110, the poster frames 110 in the view pane 105 can be repositioned to accommodate the new poster frame 110. Such re-positioning can include moving poster frames in the same row, moving a poster frame to a different row, creating a new row containing one or more poster frames, and the like. In this manner, the sequence in which the poster frames 110 are displayed can be retained. A new container can further be divided into two more containers. In some implementations, the number of containers into which one container can be divided can be specified by a user. In some implementations, the cursor can be positioned at a location on a first poster frame. An image corresponding to the location of the cursor can be displayed within the bounded region of the first poster frame. When a user strikes a key to split the first poster frame representing a container, the first of the two split poster frames representing the first split container can include all the images from the start of the first container to the image that was being previewed. The second of the two containers can include the remainder of the photographs in the first container. In some implementations, when a first container is split, each of the split containers can contain half the number of images of the first poster frame. In other implementations, when a first container is divided into a number of containers specified by the user, each split containers can contain the same number of images. In other implementations, the number of images in each split container can be specified by the user.

In some implementations, key words can be associated with poster frames 110. For example, all poster frames that represent containers containing photographs that were taken during a time frame (e.g., the same week) can be associated with common key words. The poster frames can be identified based on the key words and poster frames 110 associated with the same key words can be manipulated as a group, e.g., displayed on an view pane, deleted, merged, and the like. Alternatively, a user can provide key words to poster frames 110. For example, a user may take photographs at an event that occurs at regular intervals of time, e.g., every week. A user may associate a name to the photographs taken during the event. Subsequently, the user can identify all containers represented by 110 using the name. In another example, the images may correspond to CAD drawings where groups of drawings represent different parts of a machine. A user may assign key words denoting a part of the machine to the images corresponding to the part.

Figure 2A:
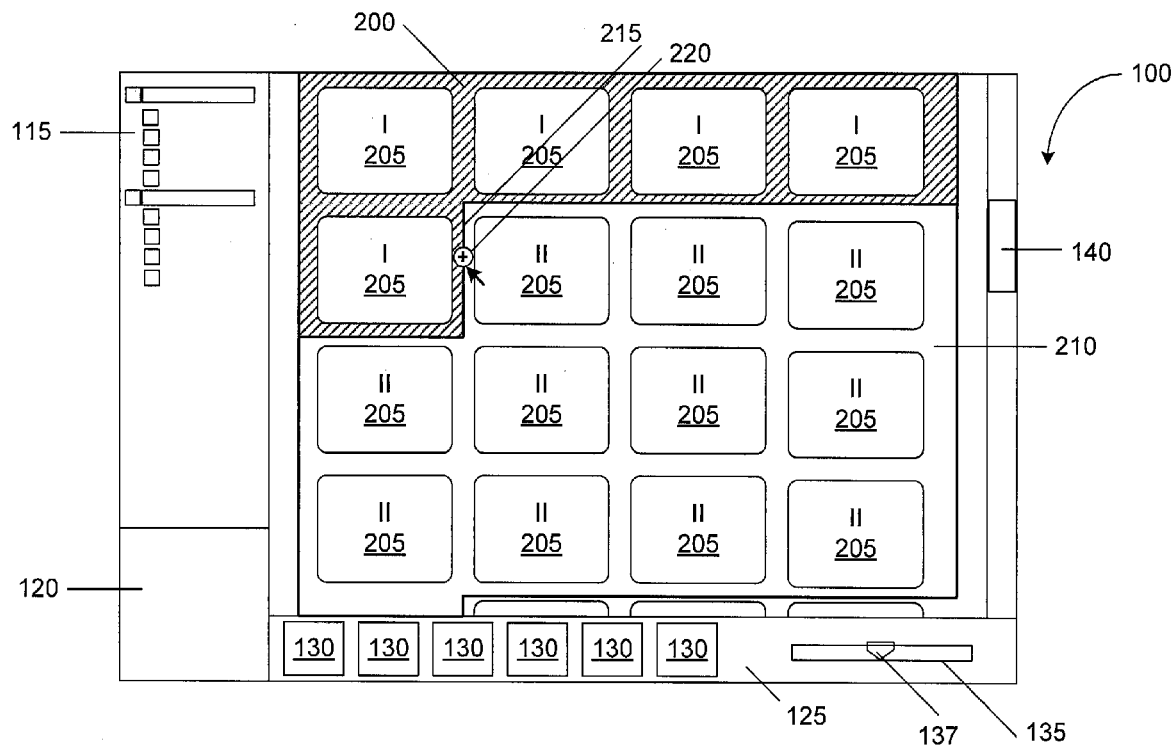
FIG. 2A is an example of a schematic of boundaries between containers.

FIG. 2A is an example of images 205 in a poster frame 110 displayed on the view pane 105. In some implementations, a user can view the images 205 in a container on the user interface 100. For example, the user can access the images 205 in a container by placing the cursor on a poster frame 110 representing the container and clicking the mouse used to control the cursor. Alternatively, the user can open the container by choosing the poster frame 110 representing the container and pressing keys on the key board, e.g., the "Enter" key. In some implementations, when the user clicks on a poster frame 110 of the view pane 105, the images 205 contained in the poster frame 110 can be displayed in the view pane 105. The images 205 in a poster frame 110 can be arranged such that the first image 205 in the container is positioned substantially adjacent to the top left corner of the view pane 105. The second image 205 in the same row can be positioned to the right of the first image 205 with a system assigned space separating the two images 205. Subsequent images 205 can be positioned in a similar manner. Each image 205 can be assigned a horizontal and a vertical dimension. When the sum of the horizontal dimensions of the images 205 in a row and the spaces between the images 205 exceeds the horizontal dimension of the view pane 105, the next image 205 in the container can be positioned as a first image 205 in a row vertically displaced from the first row, such that the first image 205 in the new row is substantially aligned with the first image 205 in the first row. In this manner, all the images 205 in a container can be arranged in one or more rows, such that the order in which the images 205 are stored in the container corresponds to an order of display beginning from left to right and top to bottom. In some implementations, the order in which images 205 are stored in a container can be based on a chronological order in which the images 205 were taken. In other implementations, the order can be based on an alphabetical arrangement based on the file name assigned to each image 205. In some implementations, a magnifying window can be positioned over the user interface such that when a user positions a cursor over an image, the image can be displayed in the magnifying window. In this manner, the user can preview the images in a container.

The orientation of the images 205 depends on the orientation of the camera used to take the photographs 205 (e.g., landscape or portrait). In a default implementation, the horizontal and vertical dimensions of an image 205 in landscape orientation can equal the horizontal and vertical dimensions of a poster frame 110 displayed in a landscape orientation in the view pane 105. The horizontal and vertical dimensions of an image 205 in portrait orientation can equal the vertical and horizontal dimensions of a poster frame 110, respectively, displayed in the view pane 105. The space separating two adjacent images 205 can equal the space separating two adjacent poster frames 110. The space separating two rows of images 205 can equal the space separating two rows of poster frames 110. Images 205 displayed in a row can be in either landscape orientation or portrait orientation. In some implementations, the bottom edges of all the images 205 in a row can be aligned. In such implementations, the top edge of the images 205 in the row may or may not be aligned depending upon the orientations of the images 205 positioned in that row. Alternatively, in some implementations, the top edges of all the images 205 in a row can be aligned.

In some implementations, the number of images 205 in a container displayed across one or more rows may exceed the vertical dimension of the view pane 105. In such implementations, a vertical scroll bar can be incorporated in the user interface 100 so the user can scroll the view pane 105 to access images 205 that are positioned outside the viewing area of the view pane 105. A user can use either the pointing device (e.g., mouse, track ball, stylus, touch pad, touch screen, near contact screen) that controls the cursor, a key board, or a combination of both to operate the vertical scroll bar and scroll the view pane 105.

In some implementations, when a user clicks on a poster frame 110, the images 205 contained in the poster frame 110 can be displayed in the order in which they are stored. The order can be based on the time when each image 205 was taken. In some implementations, one or more images 205 in a container can be compared and boundaries 215 within a container can be recommended. In some implementations, the chronological order in which the images 205 in the container were taken can be compared. For example, a user may have taken a group of photographs 205 on a first day. Subsequently, the user may have taken a second group of photographs 205 on a second day. The user may upload both groups of photographs 205 simultaneously. Initially, both groups of photographs 205 may be displayed as belonging to the same container. The time stamp on the photographs 205 may be compared and a recommendation may be presented to split the container into two groups, the first group containing the photographs 205 taken on the first day and the second group containing the photographs 205 taken on the second day.

In another example, the images 205 in a container may be compared based on the content of the images 205. A container may contain a first group of images 205 containing a blue background and a second group of images 205 containing a green background. The backgrounds of the images 205 can be compared, the images 205 of the common content (e.g., background) can be grouped, and a recommendation may be presented that the images 205 in the two groups may belong to separate containers. In some implementations, one or more combinations of content of images 205 and metadata associated with the images 205 can be used in making comparisons.

In some implementations, the recommendation to split a container into two groups can be presented by altering a display of the portion of the view pane 105 on which the thumbnails, representing the images 205 identified as belonging to the same group, are positioned. FIG. 2A depicts an example where, upon comparing the images 205 in a container displayed on the view pane 105, a first group of images 205 (depicted by "I," in FIG. 2A) and a second group of images 205 (depicted by "II," in FIG. 2A) are identified. In a default implementation, the display of the portion of the view pane 105 on which the images 205 of group I are positioned can be changed to a background 200. Similarly, the display of the portion of the view pane 105 on which the images 205 of group II are positioned can be changed to a background 210. In addition, the two groups can be separated by a boundary 215.

In some implementations, it may be determined that images 205 in a container can belong to multiple groups. In such cases, the display of the view pane 105 can be changed such that images 205 identified as belonging to the same group have a common background, regardless of the number of groups. Images 205 identified as belonging to the same group can be adjacently positioned in the same row or separately on the same or different rows.

In some implementations, in addition to providing a recommendation to split a container into two or more containers based on view pane 105 display, a user can be provided with mechanisms to accept or reject the recommendations or, alternatively, make user-modifications to the groups in a container. In some implementations, an "OK" button can be displayed at the boundary. A user can accept the boundary by positioning the cursor on the "OK" button and clicking the mouse configured to operate the cursor. In some implementations, when a user positions a cursor on an boundary 215, a merge icon 220 (e.g., a "+" sign) can be displayed at the boundary 215. If a user clicks on the merge icon 220, the two groups separated by the boundary 215 can be merged into the same group. Upon merging, the background display of the view pane 105 for the two groups can be changed to be uniform.

Figure 2B:
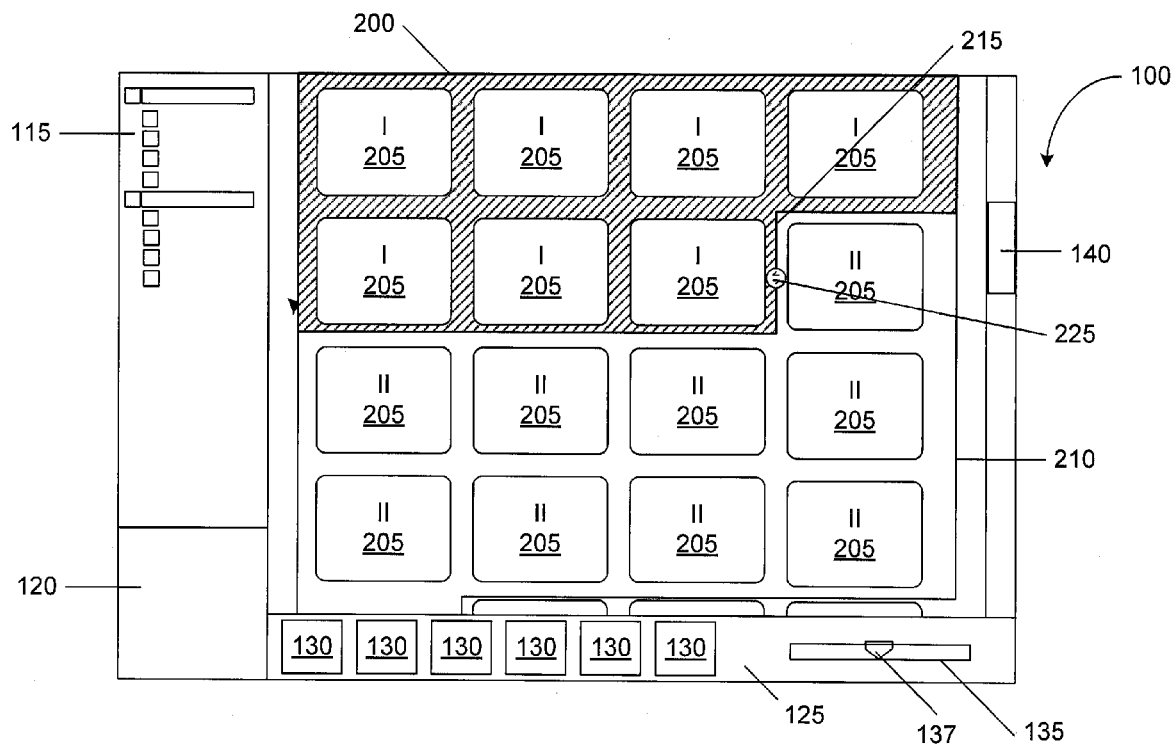
FIG. 2B is an example of a schematic of boundaries between containers.

FIG. 2B is an example of images 205 in a poster frame 110 displayed on the view pane 105. In some implementations, when a user positions the cursor at the boundary 215 between two groups of images 205, a change boundary icon 225 can be presented. An boundary 215 can be positioned between a last image 205 of a first group and a first image 205 of the last group. A user can drag the change boundary icon 225 from a current position between two images 205 to a new position between any two images 205. The new position of the change boundary icon 225 can be either on the same row as or a different row from that of the current position. The two images 205 between which the boundary 215 is positioned can either be positioned adjacent to each other on the same row or be the last image 205 of a first row and the first image 205 of a subsequent, vertically displaced row. Subsequent to moving a change boundary icon 225 to a desired position, a user can split a container into two groups of images 205.

Figure 2C:
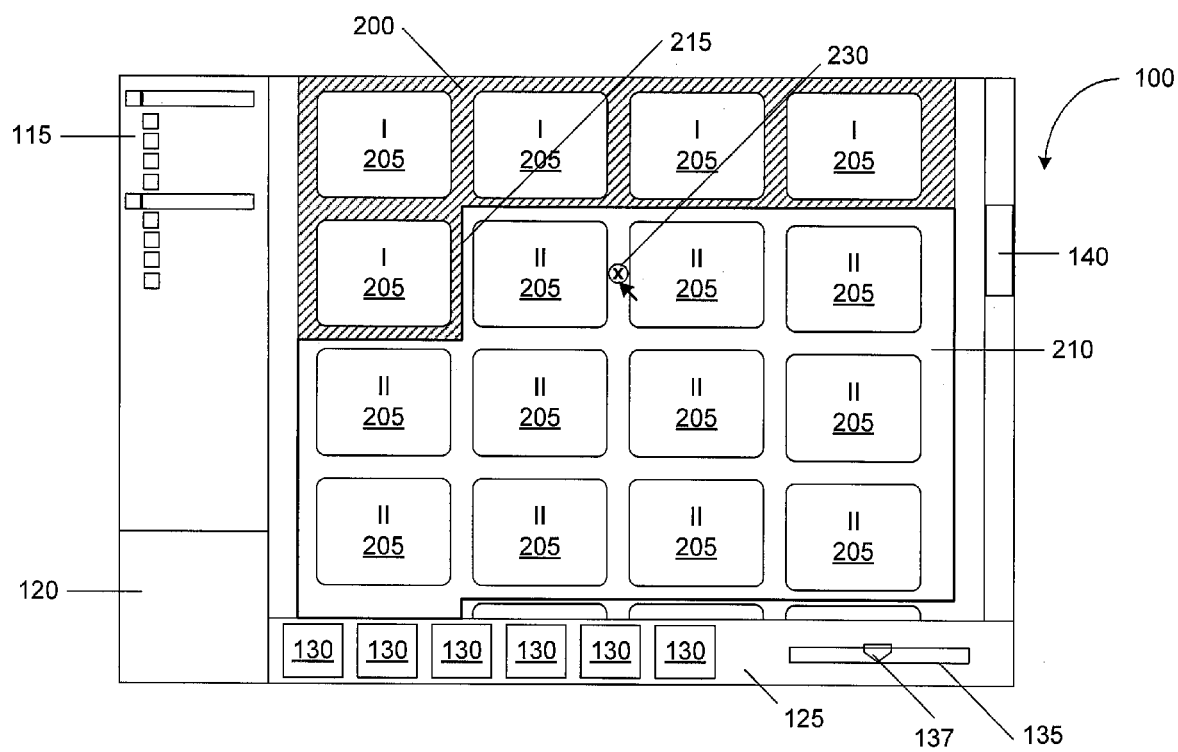
FIG. 2C is an example of a schematic of boundaries between containers.

FIG. 2C is an example of images 205 in a poster frame 110 displayed on the view pane 105. In some implementations, the user can choose an boundary 215 within a container or within a group in a container. In such implementations, when the user positions the cursor between two images 205 in a container or within a group, a split icon 230 (e.g., a "x" sign) can be displayed. The two images 205 can either be positioned adjacent to each other in the same row or be the last image 205 in a first row and the first image 205 in a subsequent, vertically displaced row. When the user clicks on the split icon 230, a boundary 215 can be created between the two images 205 where the split icon 230 was positioned.

In implementations with no boundaries in a container, when a user identifies a boundary 215 between a first and a second image 205 in the container, the images 205 from the beginning of the container to the first image 205 can be grouped to create a first container. Similarly, the images 205 from the second image 205 to the end of the container can be grouped to create a second container. Subsequently, when a view pane 105 displaying poster frames 110 representing containers is displayed, what was originally one poster frame 110 can be displayed as two poster frames 110, each poster frame 110 representing a container containing images 205 of the first and second groups, respectively.

In some implementations, one or more boundaries 215 may already be identified in a container. In such implementations, the user can specify a boundary 215 between two images 205 in a group by positioning and clicking the split icon 230 between two images 205 in the group. A first group including the images 205 beginning from the first image 205 of the group to the first of the two images 205 between which the user specified a boundary 215 can be created. A second group including the images 205 beginning from the second of the two images 205 between which the user specified boundary 215 to the last image 205 of the group can be created. In other implementations, a user can drag an image 205 from one group and include the image 205 in another group. The user can drag the images 205 across boundaries 215 by operations including drag and drop using the pointing device used to operate the cursor, cut and paste using the key board, or combinations of the pointing device and the keyboard. In this manner, a user can split images 205 in a container into one or more containers.

Subsequent to grouping images 205 into containers, when the poster frames 110 representing containers are displayed on the view pane 105, each group that was created in a container can be displayed by a new poster frame 110. The new poster frame 110 for each group can positioned at and adjacent to the same location as the poster frame 110 for the container. The remaining poster frames 110 in the view pane 105 can be repositioned such that the order of display of poster frames 110, which can represent the time line in which the images 205 in each container were taken is maintained.

Figure 3:
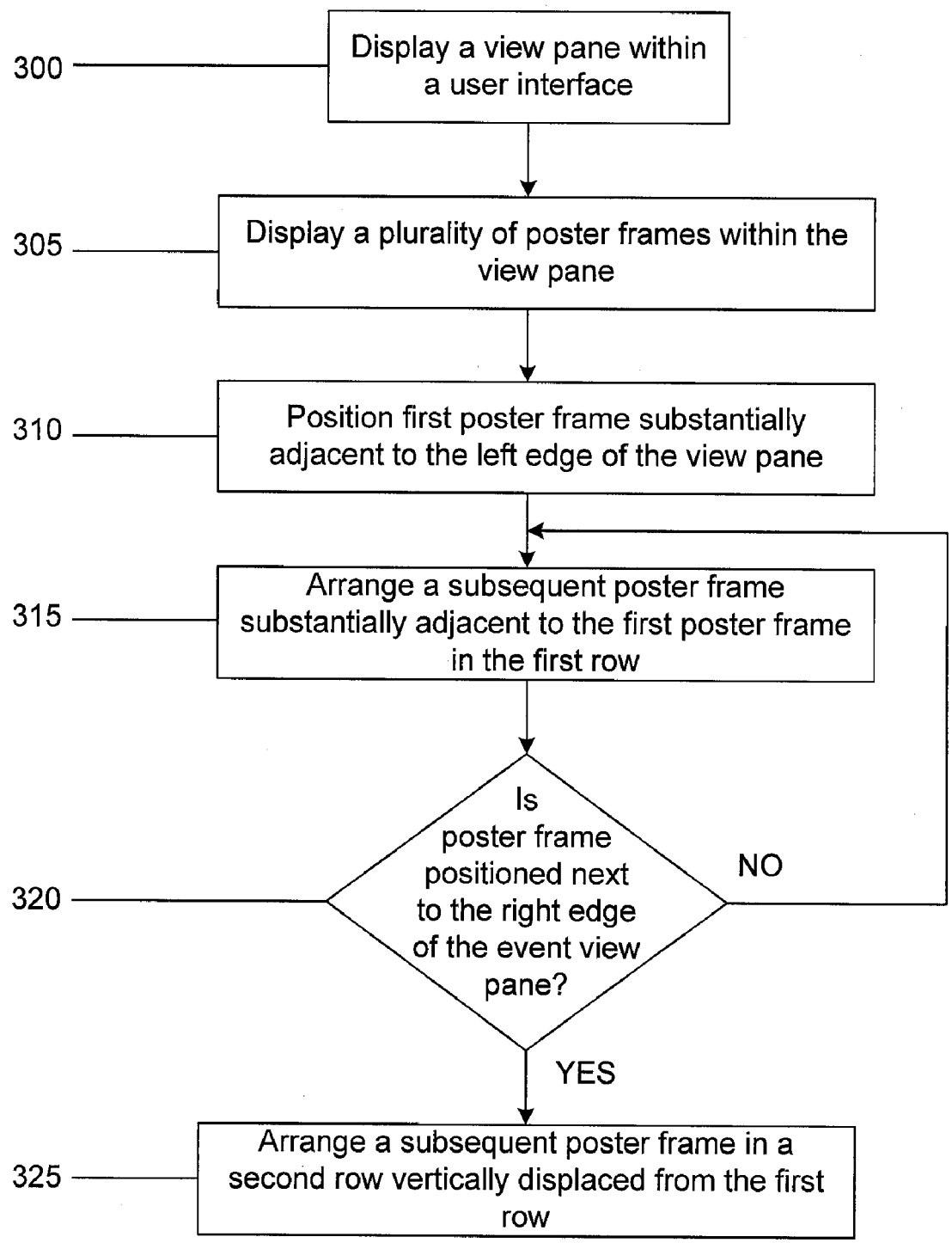
FIG. 3 is a flow chart of an example of a method of arranging poster frames in a view pane.

FIG. 3 is a flow chart showing an example of a method for arranging poster frames 110 in a view pane 105. A view pane 105 can be displayed in a user interface 100 at 300. A plurality of poster frames 110 can be displayed within the view pane 105 at 305. The poster frames 110 can represent containers that include images. The first poster frame 110 can be positioned substantially adjacent to the left edge of the view pane at 310. In some implementations, the position of the first poster frame 110 can be substantially adjacent to the corner of the left and top edges of the view pane 105. A subsequent poster frame 110 can be arranged substantially adjacent to the first poster frame in the first row at 315. In some implementations, the subsequent frame 110 can be positioned to the right of the first poster frame 110 in the first row and can be separated from the first poster frame 110 by a pre-defined space. As subsequent frames 110 are arranged in the first row, it can be checked if a poster frame 110 is positioned next to the right edge of the view pane 105 at 320. If the poster frame 110 is not positioned substantially adjacent to the right edge of the view pane 105, then the poster frames 110 can continue to be arranged in the first row of the view pane 105. Otherwise, a subsequent poster frame 110 can be arranged in a second row vertically displaced from the first row at 325. The poster frame 110 in the second row can be positioned substantially vertically aligned with the first poster frame 110 in the first row. In this manner, poster frames 110 can be arranged for display in the view pane 110.

Figure 4:
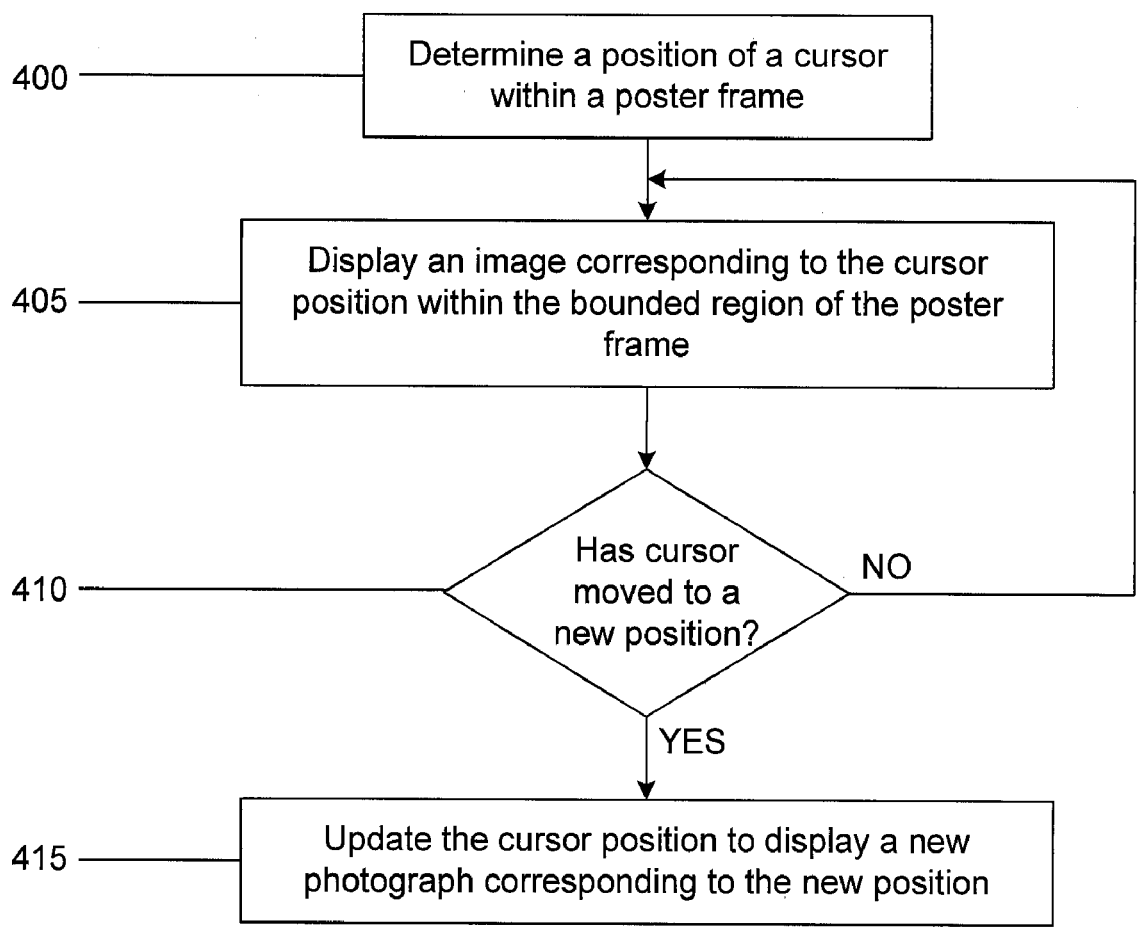
FIG. 4 is a flow chart of an example of a method of previewing images in a container represented by a poster frame.

FIG. 4 is a flow chart depicting an example of a method for previewing images in a container. A container can be represented by a poster frame 110 displayed in a view pane 105. A cursor, operated on a display device on which the view pane 105 is displayed, can be positioned on the poster frame 110. The position of the cursor within the poster frame 110 can be determined at 400. An image corresponding to the cursor position within the poster frame can be displayed in the bounded region of the poster frame 110 at 405. In some implementations, the images can be arranged such that either a horizontal motion, a horizontal component of motion, or both, of a cursor cause the images in the container to be updated. In such implementations, a vertical motion does not cause the images to be updated. Further, the cursor can be positioned at any location on the poster frame 110 for an image to be displayed in the bounded region of the poster frame 110. Subsequently, the position of the cursor may be altered. If it is determined that a cursor has moved to a new position (410), the poster frame can be updated to display a new image corresponding to the new position at 415. Otherwise, the image corresponding to the current position of the cursor can continue to be displayed in the bounded region of the poster frame 110.

A number of implementations have been described. Nevertheless, it will be understood that various modifications may be made without departing from the spirit and scope of the subject matter. For example, as the slider 135 on the user interface 100 is operated to reduce the size of the thumbnails representing frames (e.g., poster frames 110, thumbnails representing images 205), the horizontal dimension of a row of thumbnails can be decreased. In some implementations, thumbnails from one row can be repositioned to another row so that the horizontal dimension of the rows equals the horizontal dimension of the view pane 105. In other implementations, even if the horizontal dimension of the row decreases due to decrease in thumbnail dimensions, each thumbnail can be retained in the same position on the row.

In some implementations, moving the pointer 137 on the slider 135 to the right can cause an increase in the dimensions of the thumbnails. In such implementations, when the pointer 137 on the slider 135 is positioned at the right extreme of the slider 135, each thumbnail (e.g., poster frame, thumbnail representing an image 205) in the view pane 105 can occupy the entire view pane 105. In such implementations, a navigation mechanism may be incorporated into the tool bar 125 so that a user may navigate to access the thumbnails on the view pane 105.

In some implementations, the user can view each image 205 in a container in the view pane 105 by choosing the image 205. When a user views one of the images 205 in the container, the remainder of the images 205 in the container can be displayed as thumbnails in an additional pane above the view pane 105. In such implementations, the user can choose the next image 205 that the user wishes to view from the additional pane displayed above the view pane 105.

In some implementations, the two dimensional time line may correspond to a vertical positioning of thumbnails. For example, the poster frames 110 can be arranged vertically in columns. When the sum of the vertical dimensions of the poster frames 110 and the spaces between the frames exceeds the vertical dimension of the view pane 105, subsequent poster frames can be positioned in a new, horizontally displaced column. The first poster frame 110 of the new column can be substantially vertically aligned with the first poster frame 110 of the previous column. In this manner, vertical scrolling to access poster frames outside the viewing area of the view pane 105 can be avoided. When the space occupied by the columns exceeds the horizontal dimension of the view pane 105, a horizontal scroll bar can be incorporated in the user interface 100 to allow the user to navigate to access columns of thumbnails 110 that may lie outside the viewing area of the view pane 105.

In some implementations, thumbnails representing images 205 can also be displayed in columns. In other implementations, the horizontal or vertical display of poster frames and/or images 205 can be based on user input.

In some implementations, two or more poster frames 110 displayed on the view pane 105 can be merged. In other implementations, when a user scans a mouse across a poster frame 110, two images 205 positioned consecutively in the container represented by the poster frame 110 can be displayed on the frame such that the first of the two images 205 is displayed on the left half of the poster frame 110 and the second image 205 is displayed on the right half. Based on the display, the user can create boundaries 215 between the two images 205. In such implementations, a container can be split into two containers, such that the first split container contains images 205 beginning from the start of the container to the first image 205, while the second split container contains images 205 from the second image 205 to the end of the container. Subsequently, each split container can be represented by a separate poster frame 110.

In some implementations, each container can be represented by more than one frame. A second slider 135 may be incorporated in the tool bar 125 and operatively coupled to change the number of poster frames 110 used to represent a container. For example, a user may position the slider 135 such that a poster frame 110 is represented by two frames. In such cases, when the user positions the cursor over one of the two frames 110, a first image 205 corresponding to the position of the cursor on the poster frame 110 can be displayed on the first poster frame 110. An image 205 adjacent to the displayed image 205 can be displayed on the second poster frame 110. Based on the display, the user can create boundaries 215 between two images 205.

In some implementations, a user can create a new container while previewing a container by scanning the cursor across the poster frame 110. When a user creates a new container, an icon representing a new container can be displayed on the project pane 115. When the user positions the cursor on the poster frame 110, an image 205 corresponding to the position of the cursor on the poster frame 110 can be displayed. The user can include the image 205 in the new container by operations including drag and drop using the pointing device, copy and paste using the keyboard, or combinations of pointing device and keyboard operations. In this manner, the user can create one or more containers of images 205 chosen from different containers represented by poster frames 110 on the view pane 105.

Figure 5:
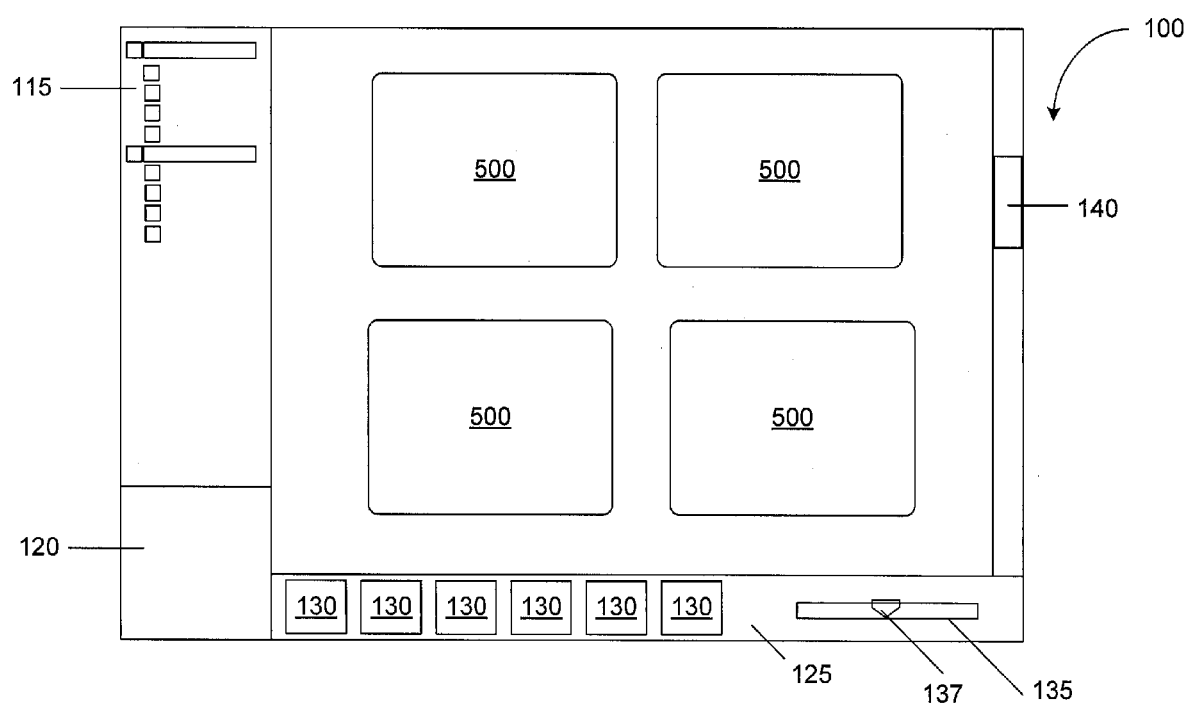
FIG. 5 is an example of contents of a container displayed in an overview mode.

FIG. 5 depicts an example of images in a container displayed in an overview mode. In some implementations, when a user accesses the images in a container, the view pane can display an overview of the images in the container. The overview mode can display one or more images 500 in the container, but not all the photographs in the container. The images 500 displayed in the overview mode can be chosen based on factors including one or more of the size of the image, the ratings of the image, user specification, and the like. For example, the overview mode can display one, more, or all the high resolution images in the container. In addition, the overview mode can display a photo display tool. The user can view all the images in the container by clicking on the photo display tool. In some implementations, the photo display tool can be positioned over one of the images in the overview mode. In other implementations, the photo display tool can be positioned away from the images in the overview mode.

The dimensions of the user interface 100 can be altered based on user input using a pointing device to operate a cursor, a keyboard, or both. In some implementations, altering the dimensions of the user interface 100 causes the dimensions of the thumbnails in the view pane 105 in the user interface 100 to be changed. In other implementations, despite a change in the dimensions of the user interface 100, the dimensions of the thumbnails remains unaltered.

In some implementations, a view pane 105 may represent folders containing files. As a user scrolls across the poster frame 110, metadata associated with the document in the folder (e.g., file name, date of creation, last date of editing, and the like) can be displayed on the poster frame 110. In other implementations, each poster frame 110 can represent a document, e.g., a text document. As the user scrolls across the poster frame 110, each page in the document can be displayed on the poster frame 110. In this manner, a user may be able to preview the contendts of the text document. In other implementations, the file can be a Adobe PDF file and each page on the PDF file can be displayed on the poster frame, the file can be a Microsoft Power Point file and each slide in the Power Point file can be displayed on the poster frame, the file can be a Microsoft Excel file and each spreadsheet in the Excel file can be displayed on the poster frame, and the like.

In some implementations, the user interface including the view pane and the poster frames representing containers of images can be viewed on virtually any suitable display device connected to the storage device on which the images are stored. The display device can include a computer monitor, an LCD screen, a projection screen, and the like. Alternatively, or in addition, the user interface and the images can be transmitted over a network (e.g., wired, wireless, internet, and the like) for display on a remote display device. In some implementations, the images to be viewed can be stored locally and can be viewed from a remote location. A system in the remote location can be operatively coupled to the local system to communicate over a network, e.g., the internet. The local system can be a server where the images can be stored and the user interface and other features of the user interface can be installed. The remote system can be a computer connected to the internet. A user at the remote system can enter a uniform resource locator (URL) pointing to the server in a web browser. In response, the local system can present the remote system with the user interface. Using the user interface, a user in the remote location can preview images. In some implementations, the images may reside on the local system. A user at the remote system can preview the images in the local system. In other implementations, the user at the remote system can preview images stored in the remote system using the user interface transmitted to the remote system from the local system over the network. In some implementations, a first user at a first remote location can perform operations including previewing images in the local or first remote system, creating containers of images, and the like, and subsequently transmit the containers with images to the local system. Subsequently, a second user wishing to view the images created by the first user can establish a connection with the local system. The local system can transmit the user interface to the second user. In this manner, the second user at the second remote location can view the contents of the containers created by the first user. In other implementations, the first user can transmit the containers containing images to the second user. The second user can access the user interface in the local system to view the images in the containers stored in the second user's remote system. Alternatively, the second user can access the images stored in the first user's system and preview the images using the user interface transmitted to the second user from the local system. In this manner, images stored in one location can be viewed and manipulated at a different location. Accordingly, other implementations are within the scope of the following claims.

What is claimed is:

1. A computer-implemented method, comprising:
    displaying, within a user interface, a view pane;
    displaying, within the view pane, a container corresponding to a bounded region, the container comprising a plurality of objects, wherein one or more positions in the bounded region correspond to the plurality of objects in the container;
    determining a number of times that each object of the plurality of objects is accessed;
    identifying a first object that is accessed the most number of times;
    automatically assigning the first object to represent the container;
    in response to the automatically assigning, displaying the first object in the bounded region corresponding to the container;
    determining a positioning of a cursor on a position of the one or more positions in the bounded region, wherein the position corresponds to a second object of the plurality of objects in the container;
    in response to determining the positioning of the cursor on the position, displaying a magnifying window adjacent to the cursor;
    displaying the second object in the magnifying window; and
    displaying the second object within the bounded region in place of the first object.

2. The method of claim 1, further comprising assigning the first object to represent the container based on factors including one or more of user input or a quality of the object.

3. The method of claim 2, wherein the user input comprises a user choosing the first object from among the one or more objects in the container.

4. The method of claim 2, wherein the quality of each object is represented by a resolution.

5. The method of claim 4, wherein the first object has a higher resolution than remaining objects in the container.

6. The method of claim 1, wherein the plurality of objects comprise one or more of photographs in a digital or digitized format and electronic images.

7. The method of claim 1, wherein one or more positions in the bounded region correspond to the plurality of objects in the container, the method further comprising:
    determining a positioning of a cursor on a position of the one or more positions in the bounded region, wherein the position corresponds to a second object of the plurality of objects in the container; and
    displaying within the bounded region the second object in place of the first object.

8. The method of claim 1, further comprising:
    determining a positioning of the cursor to another position of the one or more positions, wherein the other position corresponds to a third object;
    displaying the third object within the bounded region in place of the second object.

9. The method of claim 7, further comprising:
    displaying a magnifying window adjacent to the cursor; and
    displaying the first object in the magnifying window.

10. The method of claim 1, further comprising:
    determining that the cursor is located away from the bounded region; and
    displaying the first object within the bounded region in place of the second object.

11. The method of claim 6, wherein a position of the cursor is altered based on user input.

12. The method of claim 1, wherein the user interface can be transmitted over a network.

13. The method of claim 12, wherein the network is the internet.

14. The method of claim 12, wherein the objects displayed in the user interface can be accessed from a remote location connected to the network.

15. A non-transitory computer-readable medium storing computer program instructions executable by data processing apparatus to perform operations comprising:
    displaying, within a user interface, a view pane;
    displaying, within the view pane, a container corresponding to a bounded region, the container comprising a plurality of digital content items, wherein one or more positions in the bounded region correspond to the plurality of objects in the container;

determining a resolution of each of the plurality of digital content items;

identifying a first digital content item that has a highest resolution of the plurality of digital content items;

automatically assigning the first digital content item to represent the container;

in response to the automatically assigning, displaying the first digital content item in the bounded region corresponding to the container;

determining a positioning of a cursor on a position of the one or more positions in the bounded region, wherein the position corresponds to a second object of the plurality of objects in the container;

in response to determining the positioning of the cursor on the position, displaying a magnifying window adjacent to the cursor;

displaying the second object in the magnifying window; and displaying the second object within the bounded region in place of the first object.

16. The medium of claim 15, the operations further comprising assigning the first digital content item to represent the container based on factors including one or more of user input, or a ranking of the plurality of digital content items in the container.

17. The medium of claim 16, wherein the user input comprises a user choosing the first digital content item from among the plurality of digital content items in the container.

18. The medium of claim 16, wherein the first digital content item is a digital content item having a highest rank of the plurality of digital content items.

19. The medium of claim 16, wherein the rank of each digital content item is determined based on a number of times each digital content item is accessed.

20. The medium of claim 15, wherein the plurality of digital content items comprise one or more of photographs in a digital or digitized format and electronic images.

21. The medium of claim 15, wherein one or more positions in the bounded region correspond to the plurality of digital content items in the container, the operations further comprising:

determining a positioning of a cursor on a position of the one or more positions in the bounded region, wherein the position corresponds to a second digital content item in the container; and displaying within the bounded region the second digital content item in place of the first digital content item.

22. The medium of claim 15, the operations further comprising:

determining a positioning of the cursor to another position of the one or more positions, wherein the other position corresponds to a third digital content item;

displaying the third digital content item within the bounded region in place of the second digital content item.

23. The medium of claim 22, the operations further comprising:

displaying a magnifying window adjacent to the cursor; and displaying the first digital content item in the magnifying window.

24. The medium of claim 15, the operations further comprising:

determining that the cursor is located away from the bounded region; and displaying the first digital content item within the bounded region in place of the second digital content item.

25. The medium of claim 22, wherein a position of the cursor is altered based on user input.

26. The medium of claim 15, wherein the user interface can be transmitted over a network.

27. The medium of claim 26, wherein the network is the internet.

28. The medium of claim 26, wherein the plurality of digital content items displayed in the user interface can be accessed from a remote location connected to the network.

29. A computer-implemented method, comprising:

displaying, within a user interface, a view pane; and displaying, within the view pane, a plurality of bounded regions, each bounded region representing a container that includes a plurality of objects, wherein each container is represented by an objected included in the container;

in a first bounded region that represents a first container, displaying a first object included in the first container, wherein the first object is assigned to represent the first container;

detecting a positioning of a position indicator at a position in the first bounded region;

in response to the detecting, displaying another object in the first bounded region, wherein the other object is included in the first container, and wherein the other object corresponds to the position in the first bounded region;

detecting that the position indicator is moved from the position in the first bounded region to another position in a second bounded region that represents a second container, wherein prior to the position indicator being moved to the other position in the second bounded region, a second object included in the second container and that is assigned to represent the second container was displayed in the second bounded region; and in response to detecting that the position indicator is moved:

displaying a different object in the second bounded region in place of the second object, wherein the different object is included in the second container, and wherein the second object corresponds to a position of the position indicator in the second bounded region, and displaying the first object in the first bounded region in place of the other object.

30. The method of claim 29, wherein the first object is assigned to represent the first container based on factors including one or more of user input, a ranking of the one or more objects in the first container, or a quality of the first object.

31. The method of claim 30, wherein the user input comprises a user choosing the first object.

32. The method of claim 30, wherein the rank of each object in the first container is based on user input.

33. The method of claim 30, wherein the rank of each object is determined based on a number of times each object is accessed.

34. The method of claim 30, wherein the quality of each object is represented by a resolution.

35. The method of claim 34, wherein the first object has a higher resolution than remaining objects in the first container.

36. The method of claim 29, wherein the plurality of objects comprise one or more of photographs in a digital or digitized format and electronic images.

37. The method of claim 29, wherein the user interface can be transmitted over a network.

38. The method of claim 31, wherein the network is the internet.

39. The method of claim 31, wherein the objects displayed in the user interface can be accessed from a remote location connected to the network.

40. A non-transitory computer-readable medium storing computer program instructions executable by data processing apparatus to perform operations comprising:
displaying, within a user interface, a view pane; and
displaying, within the view pane, a plurality of bounded regions, each bounded region representing a container that includes a plurality of objects, wherein each container is represented by an objected included in the container;
in a first bounded region that represents a first container, displaying a first object included in the first container, wherein the first object is assigned to represent the first container;
detecting a positioning of a position indicator at a position in the first bounded region;
in response to the detecting, displaying another object in the first bounded region, wherein the other object is included in the first container, and wherein the other object corresponds to the position in the first bounded region;
detecting that the position indicator is moved from the position in the first bounded region to another position in a second bounded region that represents a second container, wherein prior to the position indicator being moved to the other position in the second bounded region, a second object included in the second container and that is assigned to represent the second container was displayed in the second bounded region; and
in response to detecting that the position indicator is moved:
displaying a different object in the second bounded region in place of the second object, wherein the different object is included in the second container, and wherein the second object corresponds to a position of the position indicator in the second bounded region, and
displaying the first object in the first bounded region in place of the other object.

41. The medium of claim 40, wherein the first object is assigned to represent the first container based on factors including one or more of user input, a ranking of the one or more objects in the first container, or a quality of the first object.

42. The medium of claim 41, wherein the user input comprises a user choosing the first object.

43. The medium of claim 41, wherein the rank of each object in the first container is based on user input.

44. The medium of claim 41, wherein the rank of each object is determined based on a number of times each object is accessed.

45. The medium of claim 41, wherein the quality of each object is represented by a resolution.

46. The medium of claim 45, wherein the first object has a higher resolution than remaining objects in the first container.

47. The medium of claim 40, wherein the plurality of objects comprise one or more of photographs in a digital or digitized format and electronic images.

48. The medium of claim 40, wherein the user interface can be transmitted over a network.

49. The medium of claim 42, wherein the network is the internet.

50. The medium of claim 42, wherein the objects displayed in the user interface can be accessed from a remote location connected to the network.

51. The method of claim 1, further comprising:
displaying a scroll bar adjacent to the bounded region, wherein the scroll bar includes a pointer within, the scroll bar operatively coupled to the container such that each position of the pointer within the scroll bar corresponds to an object in the container;
detecting a selection of the pointer within the scroll bar;
determining a position of the pointer in response to the selection; and
displaying within the bounded region an object that corresponds to the position of the pointer in response to the selection in place of the first object.

52. The method of claim 51, further comprising:
detecting that the pointer has moved to another position within the scroll bar; and
displaying another object that corresponds to the other position in place of the object.

53. The method of claim 51, wherein a position of the pointer is altered based on user input.

54. The medium of claim 15, the operations further comprising:
displaying a scroll bar adjacent to the bounded region, wherein the scroll bar includes a pointer within, the scroll bar operatively coupled to the container such that each position of the pointer within the scroll bar corresponds to an digital content item in the container;
detecting a selection of the pointer within the scroll bar;
determining a position of the pointer in response to the selection; and
displaying within the bounded region an digital content item that corresponds to the position of the pointer in response to the selection in place of the first digital content item.

55. The medium of claim 54, the operations further comprising:
detecting that the pointer has moved to another position within the scroll bar; and
displaying another digital content item that corresponds to the other position in place of the digital content item.

56. The medium of claim 54, wherein a position of the pointer is altered based on user input.

57. The method of claim 1, wherein displaying the first object in the bounded region comprises displaying the first object to fully occupy the bounded region.

58. The method of claim 1, wherein displaying the first object in the bounded region comprises displaying only the first object in the bounded region.

59. The medium of claim 15, wherein displaying the first digital content item in the bounded region comprises displaying the first digital content item to fully occupy the bounded region.

60. The medium of claim 15, wherein displaying the first digital content item in the bounded region comprises displaying only the first digital content item in the bounded region.

* * * * *

UNITED STATES PATENT AND TRADEMARK OFFICE
CERTIFICATE OF CORRECTION

PATENT NO. : 8,276,098 B2  
APPLICATION NO. : 11/685672  
DATED : September 25, 2012  
INVENTOR(S) : Joshua David Fagans et al.

Page 1 of 1

It is certified that error appears in the above-identified patent and that said Letters Patent is hereby corrected as shown below:

In column 24, line 16, in Claim 29, delete "objected" and insert -- object --.

In column 25, line 1, in Claim 38, delete "claim 31," and insert -- claim 37, --.

In column 25, line 3, in Claim 39, delete "claim 31," and insert -- claim 37, --.

In column 25, line 14, in Claim 40, delete "objected" and insert -- object --.

In column 26, line 3, in Claim 49, delete "claim 42," and insert -- claim 48, --.

In column 26, line 5, in Claim 50, delete "claim 42," and insert -- claim 48, --.

Signed and Sealed this  
Nineteenth Day of March, 2013

Teresa Stanek Rea  
*Acting Director of the United States Patent and Trademark Office*